(12) United States Patent
Snyder

(10) Patent No.: US 10,836,108 B1
(45) Date of Patent: Nov. 17, 2020

(54) SYSTEM AND METHOD FOR MONITORING AND INSPECTION OF FEEDSTOCK MATERIAL FOR DIRECT FEEDBACK INTO A DEPOSITION PROCESS

(71) Applicant: MADE IN SPACE, INC., Moffett Field, CA (US)

(72) Inventor: Michael Snyder, Jacksonville, FL (US)

(73) Assignee: MADE IN SPACE, INC., Moffett Field, CA (US)

( * ) Notice: Subject to any disclaimer, the term of this patent is extended or adjusted under 35 U.S.C. 154(b) by 0 days.

(21) Appl. No.: 16/025,755

(22) Filed: Jul. 2, 2018

Related U.S. Application Data

(60) Provisional application No. 62/527,705, filed on Jun. 30, 2017.

(51) Int. Cl.
   *B29C 64/393* (2017.01)
   *B29C 64/20* (2017.01)
   *B29C 64/165* (2017.01)

(52) U.S. Cl.
   CPC .......... *B29C 64/393* (2017.08); *B29C 64/165* (2017.08); *B29C 64/20* (2017.08)

(58) Field of Classification Search
   CPC ...... B29C 64/393; B29C 64/20; B29C 64/165
   See application file for complete search history.

(56) References Cited

U.S. PATENT DOCUMENTS

| | | | |
|---|---|---|---|
| 3,534,926 A | 10/1970 | Wuenscher | |
| 3,583,467 A | 6/1971 | Bennett et al. | |
| 4,093,019 A | 6/1978 | Seybold et al. | |
| 4,439,979 A | 4/1984 | Winkelmann | |
| 4,614,630 A | 9/1986 | Pluim, Jr. | |
| 4,729,780 A | 3/1988 | Shimizu | |
| 4,753,730 A | 6/1988 | Maurer | |
| 5,259,436 A | 11/1993 | Yun et al. | |
| 5,303,141 A | 4/1994 | Batchelder et al. | |

(Continued)

FOREIGN PATENT DOCUMENTS

| | | |
|---|---|---|
| DE | 10335735 | 2/2005 |
| EP | 2727709 | 5/2017 |

(Continued)

OTHER PUBLICATIONS

Cooper et al., "Microgravity Manufacturing Via Fused Deposition," NASA, Jul. 2003, https://ntrs.nasa.gov/archive/nasa/casi.ntrs.nasa.gov/20030067856.pdf.

(Continued)

*Primary Examiner* — Charles R Kasenge
(74) *Attorney, Agent, or Firm* — Terry M. Sanks, Esq.; Beusse Sanks, PLLC

(57) ABSTRACT

A system including a deposition system to create a layer of an object during an additive manufacturing process, a material feeder to deliver a material for application to the object by the deposition system, a first sensor to measure at least one characteristic of the material, a rangefinder to determine a height of the deposition system above a build location where the object is being additively manufactured, and a traverse system to adjust a height of the deposition system from the build location responsive to a measurement taken by the first sensor. Another system and method are also disclosed.

29 Claims, 17 Drawing Sheets

(56) References Cited

U.S. PATENT DOCUMENTS

| | | |
|---|---|---|
| 5,541,802 A | 7/1996 | Bodahl-Johnsen |
| 5,562,150 A | 10/1996 | Shimmell |
| 5,775,402 A | 7/1998 | Sachs et al. |
| 6,004,124 A | 12/1999 | Swanson et al. |
| 6,135,880 A | 10/2000 | Ho et al. |
| 6,143,378 A | 11/2000 | Harwell et al. |
| 6,367,765 B1 | 4/2002 | Wieder |
| 6,431,975 B1 | 8/2002 | Ryan |
| 6,575,548 B1 | 6/2003 | Corrigan et al. |
| 6,772,026 B2 | 8/2004 | Bradbury et al. |
| 7,045,738 B1 | 5/2006 | Kovacevic et al. |
| 7,168,935 B1 | 1/2007 | Taminger et al. |
| 7,777,155 B2 | 8/2010 | Twelves, Jr. et al. |
| 8,342,229 B1 | 1/2013 | Ziani et al. |
| 8,983,957 B2 | 3/2015 | Rathod |
| 10,265,911 B1* | 4/2019 | Capri .................... G06T 7/001 |
| 2001/0030383 A1 | 10/2001 | Swanson et al. |
| 2003/0230393 A1 | 12/2003 | Kimura et al. |
| 2003/0235635 A1 | 12/2003 | Fong et al. |
| 2004/0003738 A1 | 1/2004 | Imiolek et al. |
| 2004/0035542 A1 | 2/2004 | Ederer et al. |
| 2004/0145629 A1 | 7/2004 | Silverbrook |
| 2005/0023710 A1 | 2/2005 | Brodkin et al. |
| 2005/0133653 A1 | 6/2005 | Heaney et al. |
| 2005/0194401 A1 | 9/2005 | Khoshnevis |
| 2006/0156978 A1 | 7/2006 | Lipson et al. |
| 2007/0267165 A1 | 11/2007 | Monteiro et al. |
| 2008/0136066 A1 | 6/2008 | Taylor et al. |
| 2008/0150192 A1 | 6/2008 | Perret et al. |
| 2009/0050289 A1 | 2/2009 | Lismont |
| 2009/0076643 A1 | 3/2009 | Silverbrook |
| 2009/0177309 A1 | 7/2009 | Kozlak |
| 2009/0208577 A1 | 8/2009 | Xu et al. |
| 2009/0252925 A1 | 10/2009 | Provoost et al. |
| 2009/0267269 A1 | 10/2009 | Lim et al. |
| 2011/0030557 A1 | 2/2011 | Brownstein et al. |
| 2012/0113473 A1 | 5/2012 | Pettis |
| 2013/0209600 A1 | 8/2013 | Tow |
| 2014/0020192 A1 | 1/2014 | Jones et al. |
| 2014/0048970 A1* | 2/2014 | Batchelder .......... B29C 67/0055 264/129 |
| 2014/0050921 A1 | 2/2014 | Lyons et al. |
| 2014/0085620 A1 | 3/2014 | Lobovsky et al. |
| 2014/0252668 A1 | 9/2014 | Austin et al. |
| 2014/0268604 A1 | 9/2014 | Wicker et al. |
| 2014/0277659 A1 | 9/2014 | Kumar et al. |
| 2014/0316546 A1 | 10/2014 | Walsh et al. |
| 2015/0096713 A1 | 4/2015 | Marcin |
| 2015/0104802 A1 | 4/2015 | Reep et al. |
| 2015/0108687 A1 | 4/2015 | Snyder et al. |
| 2015/0165693 A1 | 6/2015 | Sagoo et al. |
| 2015/0186757 A1* | 7/2015 | Priyadarshi .............. B41J 29/00 358/1.5 |
| 2015/0209978 A1 | 7/2015 | Snyder et al. |
| 2016/0023486 A1* | 1/2016 | Priyadarshi .............. B41J 29/00 347/110 |
| 2016/0067919 A1 | 3/2016 | Hoyt et al. |
| 2016/0068793 A1 | 3/2016 | Maggiore |
| 2016/0082652 A1 | 3/2016 | Snyder et al. |
| 2016/0167254 A1 | 6/2016 | Cushing et al. |
| 2016/0184893 A1 | 6/2016 | Dave et al. |
| 2016/0207262 A1 | 7/2016 | Trowbridge |
| 2016/0243759 A1 | 8/2016 | Snyder et al. |
| 2017/0038342 A1 | 2/2017 | Clavette et al. |
| 2017/0072643 A1* | 3/2017 | Ng ......................... B29C 64/20 |

FOREIGN PATENT DOCUMENTS

| | | |
|---|---|---|
| GB | 2399049 | 1/2006 |
| JP | 2009013395 | 1/2009 |
| WO | 2014070007 | 5/2014 |
| WO | 2014/144098 | 9/2014 |
| WO | 2015066607 | 5/2015 |

OTHER PUBLICATIONS

Crockett et al., ,"Fused Deposition Modeling Microgravity," NASA, 1999, http://sffsymposium.engr.utexas.edu/Manuscripts/1999/1999078-Crockett.pdf.

Gaerisl, "Fume Chamber (Negative-Pressure, Activated Carbon Filtering)," https://www.thingiverse.com/thing:13851, Nov. 23, 2011.

O'Connell, Frank, "A Machine that Gives Shape to Your Ideas," https://archive.nytimes.com/www.nytimes.com/interactive/2011/06/15/technology/personaltech/20110915-BASICS.html?_r=0, Sep. 14, 2011.

LeftAngle, "Injection Printing—Injection Molding on Your 3D Printer," Thingiverse, https://www.thingiverse.com/thing:82666, May 1, 2013.

LeftAngle, "Extreme High Definition Parts on Your 3D Printer," https://www.thingiverse.com/thing:83805, May 4, 2013.

Dunn et al., "3D Printing in Space: Enabling New Markets and Accelerating the Growth of Orbital Infrastructure," Space Studies Institute, Oct. 29-31, 2010.

* cited by examiner

SYSTEM AND METHOD FOR MONITORING AND INSPECTION OF FEEDSTOCK MATERIAL FOR DIRECT FEEDBACK INTO A DEPOSITION PROCESS

CROSS-REFERENCE TO RELATED APPLICATIONS

This application claims the benefit of U.S. Provisional Application No. 62/527,705 filed Jun. 30, 2017, the entirety of which is incorporated by reference.

BACKGROUND

Embodiments relate to a manufacturing deposition process and, more particularly, to evaluating material feedstock or material to be sintered as the material is transferred for deposition to determine parameters of the deposition device.

Additive manufacturing techniques enable the rapid creation of objects, structures, portions thereof, prototypes, replacement parts, experimental parts, and make-shift items. Additive manufacturing devices may produce parts via additive processes in which material is sequentially bonded or otherwise mechanically or chemically joined together in order to form the desired object.

One class of additive manufacturing devices is fused deposition modeling (FDM) devices which utilizes a source of thermoplastics to produce parts. FDM devices often comprise a horizontally-oriented build table positionable in the z-axis and an extrusion nozzle which may be positioned where desired in an X/Y-plane. Positioning is controlled by worm gears, belt drives and the like. The extrusion nozzle is positioned and heated to a temperature which will melt supplied thermoplastic. Thermoplastic is fed through the nozzle, thereby depositing a desired amount of molten plastic at a location order to form a portion of a part.

Another class of additive manufacturing devices is sintering or selective laser sintering ("SLS") that uses a laser as the power source to sinter powdered material by aiming a laser at points in space defined by a three-dimensional model, binding the material together to create a solid structure. Another class of additive manufacturing devices is selective laser melting where that material is fully melted rather than sintered. The powdered material may be metallic powders or nylon/polyamide powders.

The extensive quality control issues involved with additive manufacturing and other deposition processes create discrepancies in the items that are produced due to the variability of many parameters that can be altered from things such as changes in ambient conditions (temperature, pressure, humidity) or manufacturing differences (different material sourcing, machinery wear, etc.). Quality control issues are exasperated in microgravity environments and high-vibration environments where maintaining a consistent flow of material through the extrusion nozzle may also be complicated.

In microgravity environments, FDM devices are unable to adequately position the extrusion nozzle relative to the build table, causing part construction failure. Maintaining a consistent flow of material through the extrusion nozzle may also be complicated. There is also risk that molten thermoplastic or feedstock may migrate or otherwise float away before adhering to the desired location due to the lack of net external force to hold the material down. Similarly, in high-vibration environments, terrestrial additive manufacturing devices are unable to stabilize the position of the extrusion nozzle or other material deposition means relative to the build area, nor is a consistent flow of molten material achieved, preventing consistent creation of a part.

Manufactures and users of additive manufacturing devices need to be able to correct both before, during, and after the deposition process takes place to achieve higher quality products.

SUMMARY

Embodiments relate to a system and a method for evaluating material feedstock or material to be sintered as the material is transferred for deposition to determine parameters of the deposition device.

The system comprises a deposition system to create a layer of an object during an additive manufacturing process and a material feeder to deliver a material for application to the object by the deposition system. The system also comprises a first sensor to measure at least one characteristic of the material, a rangefinder to determine a height of the deposition system above a build location where the object is being additively manufactured, one or more build environment sensors to measure at least one property of the build environment, and a traverse system to adjust a height of the deposition system from the build location responsive to a measurement taken by the first sensor. The material feeder may adjust operating parameters (speed of material feeding, heater temperature) responsive to a measurement taken by the one or more build environment sensors or by the first sensor. In an embodiment, the system further comprises an ECU which alters the build environment responsive to measurements from the first sensor and/or the build environment sensors. The material feeder may adjust operating parameters and the traverse may adjust the height of the deposition system responsive to ECU operation.

The method comprises inspecting a material to be applied by an additive manufacturing deposition system with at least one sensor and determining whether a correction in a parameter effecting the material prior to the material reaching a deposition system is needed as the material travels to the deposition system. The method further comprises measuring a distance of the deposition system from a build surface to determine whether a distance between the deposition system and the build surface corresponds to a height associated with at least one measurement obtained from the at least one sensor. The method further comprises adjusting the distance of the deposition system from the build surface when the at least one measurement changes where a different height provides for a desired deposition consistency of the material during the deposition process.

Another system comprises an additive manufacturing device. The additive manufacturing device comprises a deposition system, a material storage device to hold a material prior to deposition, a material feeding system to provide the material to the deposition system and a build area where an object is created with an additive manufacturing process. The system further comprises at least a first sensor to detect at least one characteristic of a material to be applied to create an object with an additive manufacturing process, a rangefinder to determine a height of the deposition system from the build area and a traverse system to adjust, in real time, the deposition system in response to a characteristic of the material detected during a deposition process.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
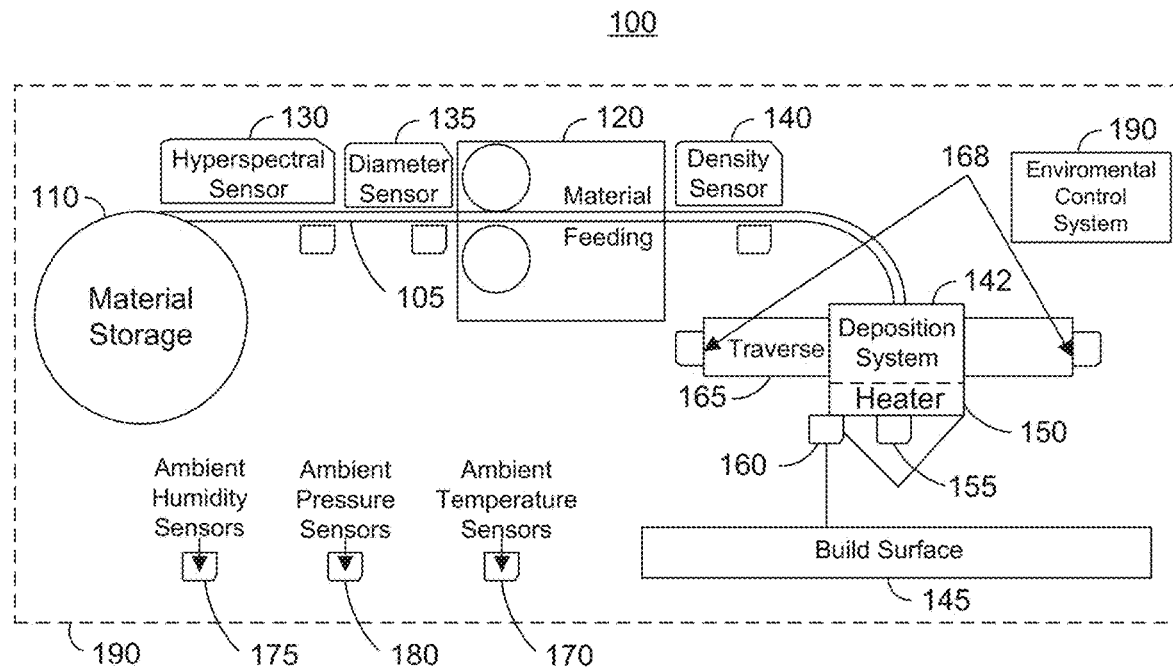
FIG. 1 illustrates an embodiment of a system for monitoring and inspection of feedstock material during a deposition process using feedstock.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows an embodiment of a system for monitoring and inspection of feedstock material during a deposition process. Within the system 100, material 105 such as, but not limited to, feedstock, that is stored in a material storage area or container 110, is moved into a material feeding system 120. In one configuration, on the way to the material feeding system 120, the material 105 may be scanned and/or evaluated such as, but not limited to, with several sensors which provides sensor data to a computing functionality as described in further detail with respect to FIG. 31. Non-limiting examples of the sensors include, but are not limited to, a hyperspectral sensor 130 and a diameter sensor 135 (or particulate size sensor when used with material to be sintered). The hyperspectral sensor 130 may be used to scan the material 105, or feedstock, to identify the type of material as well as an overall geometry of the material. The diameter sensor 135 may be used to determine a size such as, but not limited to, diameter of the material 105.

Based on the data, parameters affecting at least one of, but not limited to, a feed rate, temperature, and speed of movement of the feedstock may be changed or altered to meet a performance criteria. The change or alternation may be accomplished by adjusting the equipment such as, but not limited to, adjusting environmental conditions where additive manufacturing is taking place and adjusting placement of the equipment such as, but not limited to, a deposition system 142, discussed further herein.

Figure 31:
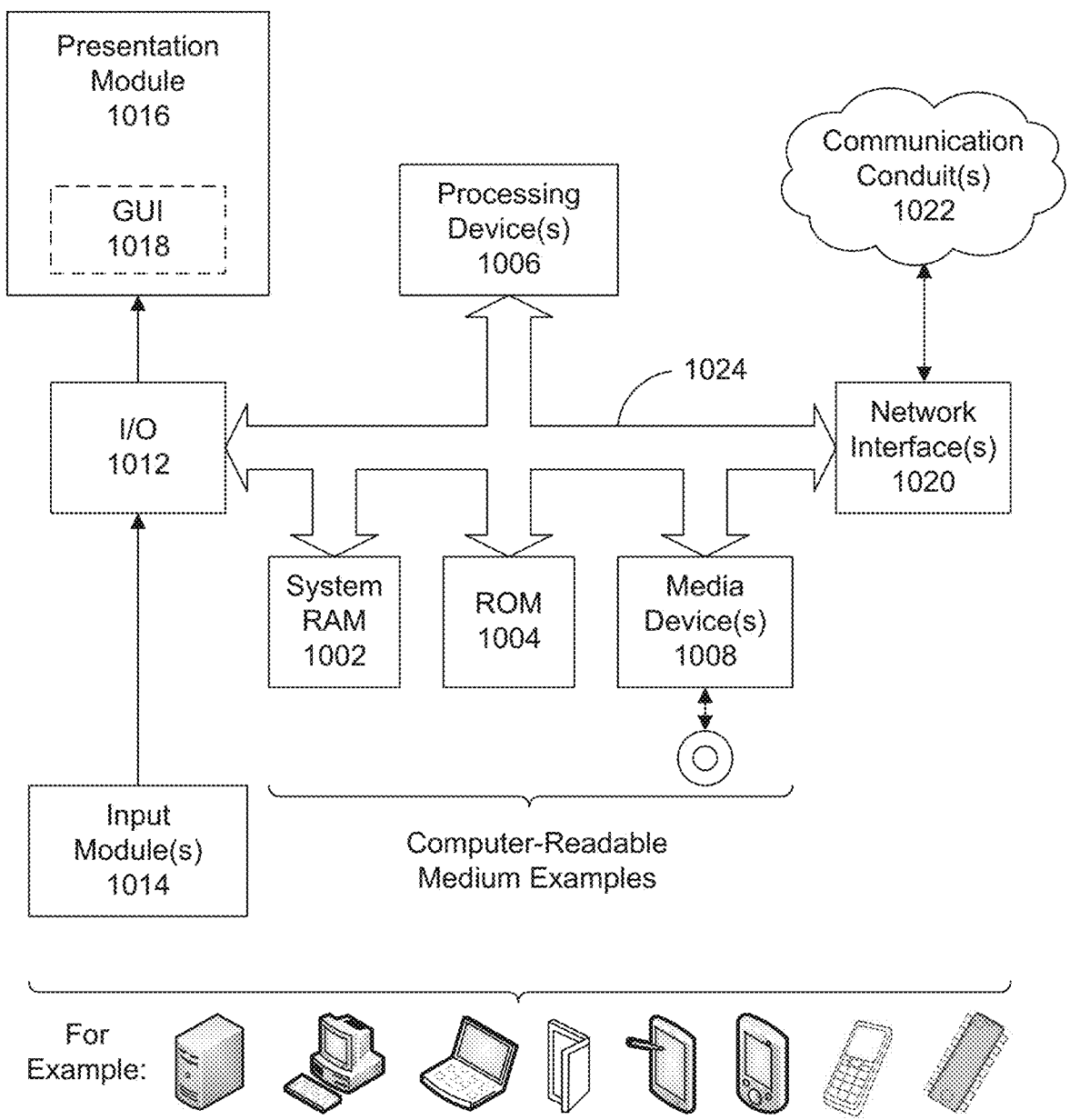
FIG. 31 shows a block diagram illustrating computing functionality of a processing system that may be used to implement an embodiment disclosed herein.

After exiting the material feeding system 120, a density sensor 140 may be provided to measure the material 105 or feedstock to assist in determining parameters such as, but not limited to, extrusion speed and die swell related attributes, as will be explained in further detail with respect to FIG. 31. The deposition system 142 may then deposit the material 105 or feedstock onto a build surface 145 during an FDM process. The area around and between the deposition system 142 and the build surface 145 may be referred to as the build environment. The deposition system 142 may comprise a heater 150 to melt the feedstock 105 to produce the feedstock 105 in a liquid or gel form for additive layering at the build surface 145. A temperature sensor 155 may also be provided at the deposition system 142 to determine a temperature of the feedstock 105 either as or immediately before the feedstock 105 exits the deposition system 142. A rangefinder 160 may be used to keep the deposition system 142 at a same, or desired, height above the build surface 145 during the build process by constantly taking measurements and having a traverse system 165 adjust the location of the deposition system 142. In a non-limiting situation, position sensors 168 may be used to provide data regarding placement of the deposition system 142 and/or traverse system 165. The rangefinder 160 may be used to vary the height of the deposition system or a nozzle of the deposition system through which the feedstock exits, depending on the other sensor readings to ensure a proper deposition consistency of the material. Also shown are temperature sensors 170, humidity sensors 175 and pressure sensors 180. These sensors 170, 175, 180 may be used in association with an environmental control unit 190 which may be used to regulate the environment at the build surface or build environment. As shown, the build surface 145 may at least be within an enclosed device 190 and the environmental control unit 190 regulates the environment, based on data collected from the aforementioned sensors to at least one of reduce or eliminate contamination and/or outgassing at the build surface 145 and between the build surface 145 and the deposition system 142. More specifically, the environmental control unit 190 may alter the build environment responsive to measurements from at least one sensor and/or a build environment sensor such as, but not limited to, the temperature sensor 155, 170, humidity sensor 175 and/or pressure sensor 180. The computing functionality disclosed in FIG. 31 is used to make the adjustments based on the measurements received.

The operating parameters of the material feeder 120 such as, but not limited to, the speed at which material is fed by the material feeder, may be adjusted responsive to a measurement taken by at least one build environment sensor and at least one other sensor (hyperspectral sensor 130, diameter sensor 135, density sensor 140). Also, the temperature of the heater 150 of the deposition system 142 may be adjusted responsive to a measurement taken by at least one build environment sensor and at least one of the other sensors 130, 135, 140 and the temperature sensor 155. The computing functionality disclosed below with respect to FIG. 31 is used to make the adjustments based on the measurements received.

Further, the material feeder 120 may adjust operating parameters and the traverse 165 may adjust the height of the deposition system responsive to ECU 190 operation.

Figure 2:
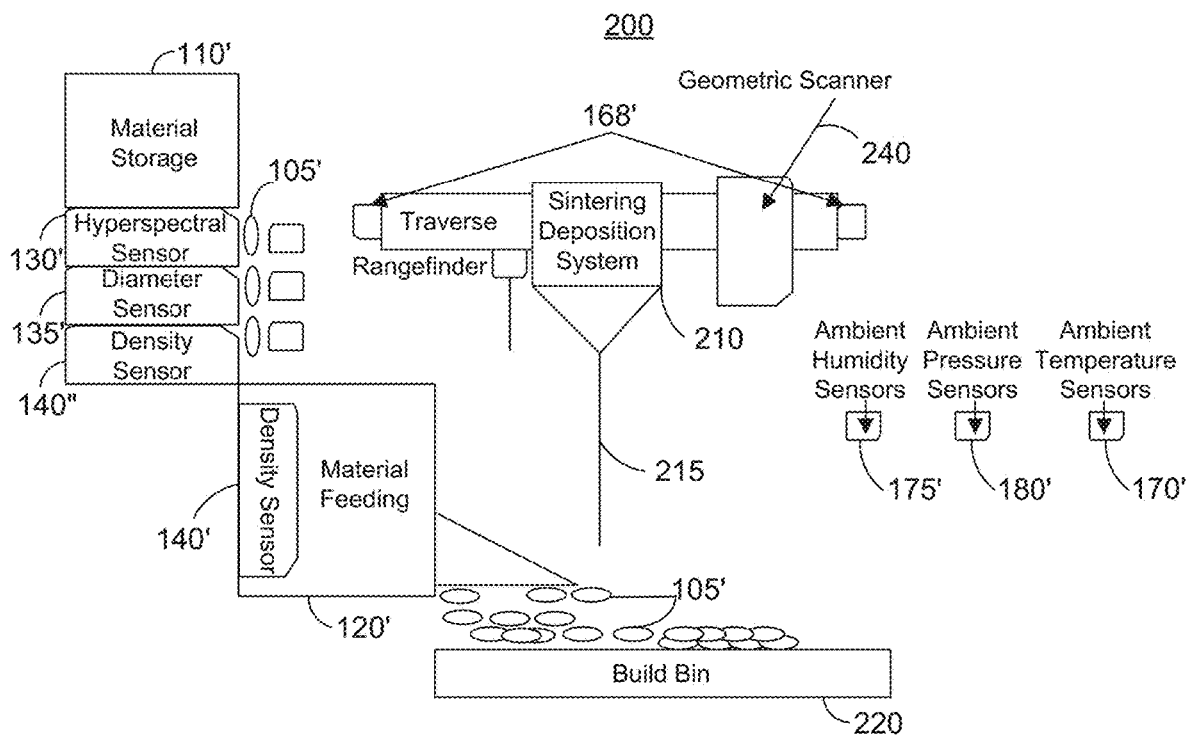
FIG. 2 illustrates another embodiment of a system using sintering.

FIG. 2 shows an embodiment of a system for sintering deposition. In general, the embodiment of the system 200 disclosed herein may be applicable where the material 105' is at least one of filament wire, powder (of various materials), liquids, gases, traditional manufacturing systems, and other robotic manufacturing methods. As discussed above, the various sensors already discussed are provided in combination with the material storage unit 110', a sintering deposition system 210, the material feeder 120' and build area 145.

More specifically, the material storage area or container 110' is provided to store the material 105'. As the material 105' leaves the material storage area 110', the material 105' is sensed by the hyperspectral sensor 130', diameter sensor 135' and density sensor 140'. Each of these sensors may be arranged based on the type of material 105' being used. Thus, each sensor is mechanized with respect to whether the material 105' is a filament, powder, liquid or gas. The material 105' is provided to a material feeding device 120' that may move laterally across the build bin 220 or build area to locate the material 105' on the build bin 220 or build area. A density sensor 140' is shown in use with the material feeding device 120'. The density sensor 140' may be in both locations as shown in FIG. 2, providing for two density sensors 140' or in another embodiment only one is used in either one of the locations shown in FIG. 2.

A sintering deposition system 230 is provided to provide a heating source such as, but not limited to, a laser, where a beam 215 from the laser is directed towards the material 105' at the build bind 220. A traverse system 165' is provided to control placement of the sintering deposition system 230. Position sensors 168' are also provided to determine placement of the sintering deposition system 230. A geometric scanner 240 is also disclosed. The geometric scanner 240 may be provided to scan a product being made at the build bin 220. Though the geometric scanner 240 is not shown in FIG. 1, the geometric scanner 240 may also be used in the system 100 of FIG. 1.

A rangefinder 160' is also provided. As disclosed above, the rangefinder 160' may be provided to determine a height of the deposition system 230 above the build bin 220 for positioning the deposition system 230 with respect to the build bin 220. Also disclosed above with respect to FIG. 1, a temperature sensor 170', humidity sensor 175' and pressure sensor 180' may be provided. These sensors 170', 175', 180' may be used to measure ambient temperature, humidity and pressure at the build bin 220. Though not shown, the environmental control unit 190 illustrated in FIG. 1 may also be included in the system 200 of FIG. 2.

A variety of other sensors may be included in either system 100, 200. Therefore, the sensors mentioned above are not provided to represent a limited type of sensors. Other sensors may include, but is not limited to, a thermographic sensor or infrared sensor (to capture a thermal image of the material 105, 105' or the object being built), an ultraviolet sensor (for use as, but not limited to, germicidal lamp and monitoring filtering ability and stability of the material 105, 105' or object being built), a visible light sensor (to detect and convey information that constitutes an image taken of the material 105, 105' or the objecting being built), an ultrasound sensor (to measure a distance), a vibrational sensor (to determine vibrational effects upon the material 105, 105' or the object), a computed tomography (CT) based sensor (to cross-sectional images of the material 105, 105' or the object being built), a single wavelength sensor (to determine whether a specific wavelength is being emitted from the material 105, 105' or the object being built), a multi-wavelength sensor (to determine one or more wavelengths that may be individually or collectively emitted from the material 105, 105' or the object being built), a mass sensor (to determine a mass of the material 105, 105' or the object being built), a radiation sensor (to detect Gamma or Beta radiation if the material 105, 105' is recycled), a barometer (to measure atmospheric pressure at the build area 145 or build bin 220), a manometer (to measure pressure at the build surface 142 or build bin 220), a sensor to detect internal properties of the material, etc.

Figure 3:
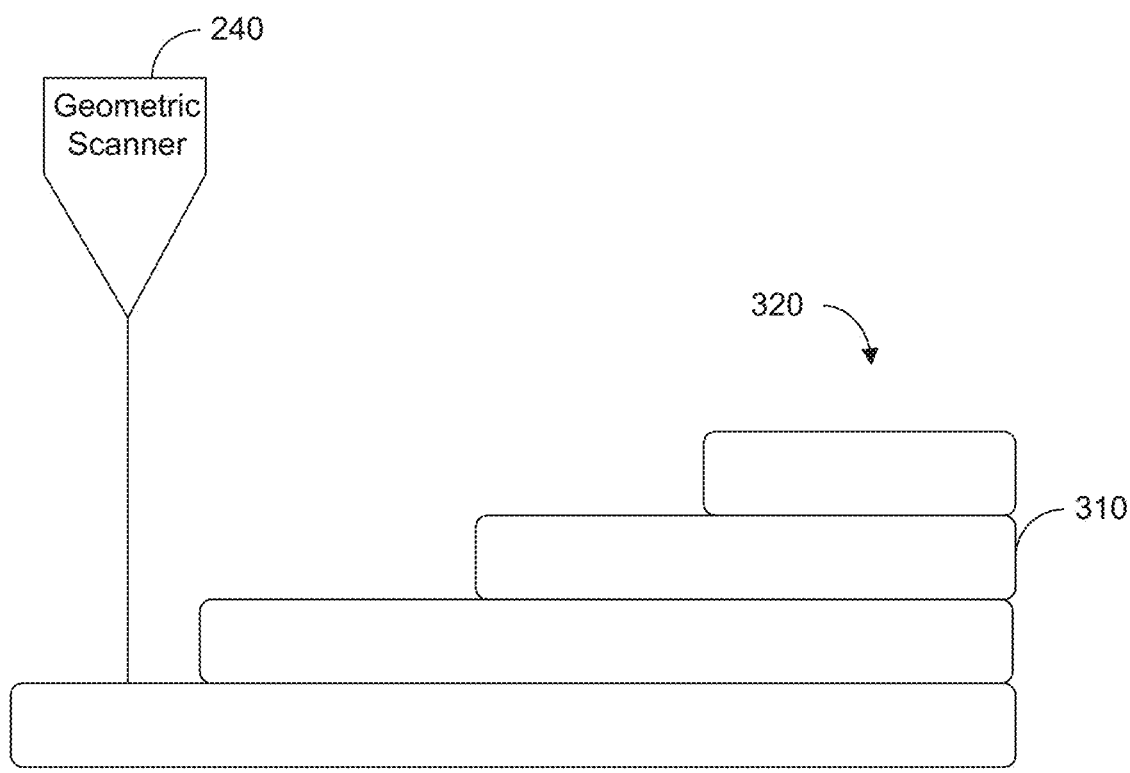
FIG. 3 illustrates an embodiment of a system utilizing post deposition inspection.

FIG. 3 shows an embodiment of a system utilizing post deposition inspection. As shown, once deposition is complete, the geometric scanner 240 may be used to inspect a layer 310 of an object 320 or part being built. Though multiple layers are shown in FIG. 3, in an embodiment, the geometric scanner 240 may be used to inspect each layer 310, every other layer 310, or any inspection protocol that is established. Though the geometric scanner 240 is shown in FIG. 2, it may also be utilized in the system 100 shown in FIG. 1.

Figure 4:
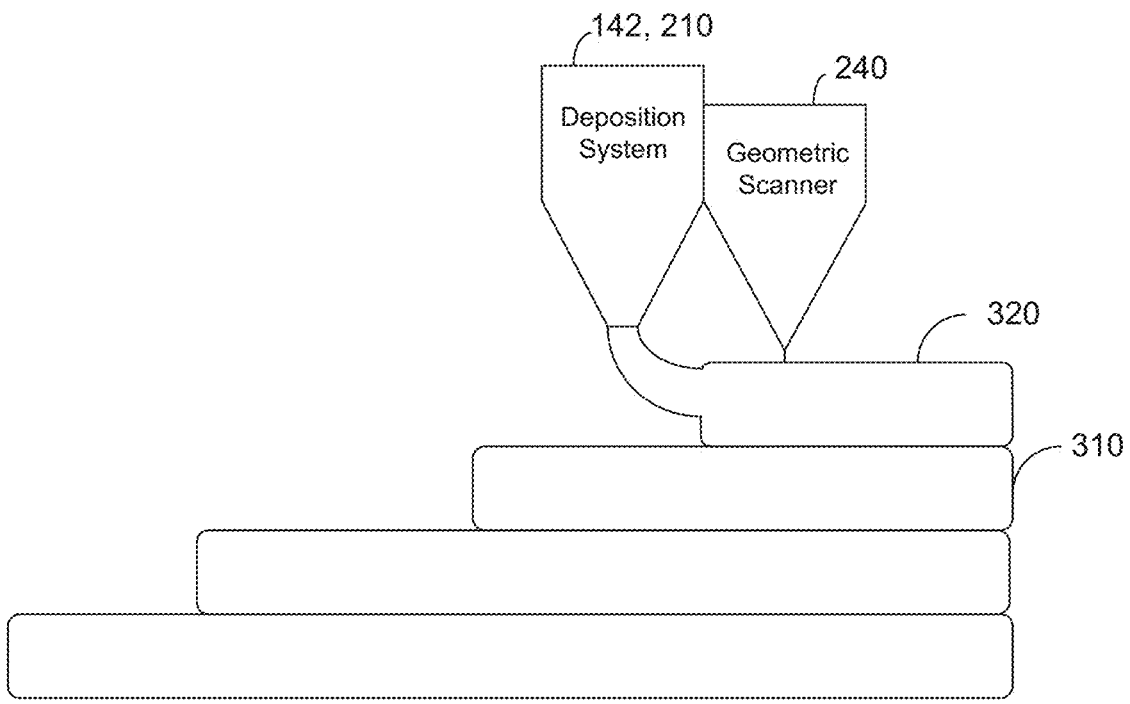
FIG. 4 illustrates an embodiment of a system where inspection is occurring during deposition.

FIG. 4 shows an embodiment of a system where inspection is occurring during deposition. As shown in FIG. 3, the geometric scanner 240 is provided working in unison with the deposition system 142, 210. The geometric scanner 240 may be provided to measure geometric properties of the feedstock 105, 105' immediately after it has been applied to the object 320 or part that is being built by the deposition system 142, 210.

Figure 5A:
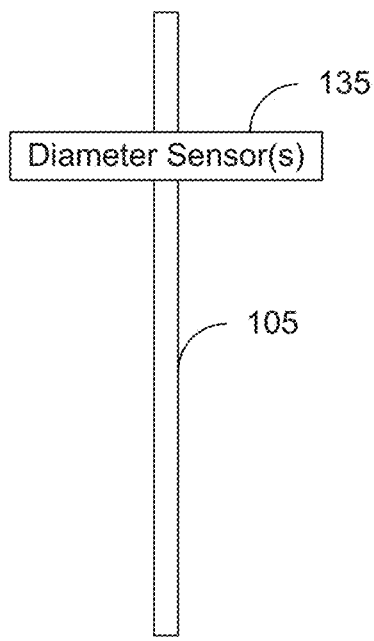
FIGS. 5A and 5B show representations of respective size sensors inspecting a feedstock and material to be sintered.
Figure 5B:
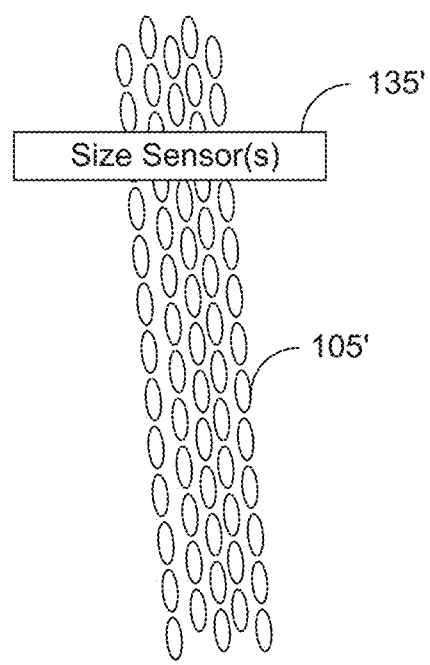

FIGS. 5A and 5B show representations of respective size sensors inspecting a feedstock and material to be sintered. In an embodiment, an ability to measure the material 105, 105' or feedstock as it is transferred from a storage location to the position of deposition occurs. As disclosed above, the size sensors may be at least one of a diameter sensor 135, 135'. Use of the measurements may be used to determine parameters of the deposition system 142, 210. Measurements can be of diameter, absolute density, density gradients, anomalies, mass, humidity, temperature, etc. These measures may be provided to a feedback system, such as is disclosed in FIG. 31, that calculates a correction needed to achieve a desired deposition quality. The measurements may be taken at various points along the process, including after deposition, and the results may be used to determine system operational parameters that can be adjusted. Thus, the locations of the sensors in FIGS. 1 and 2 are not limiting.

Figure 6A:
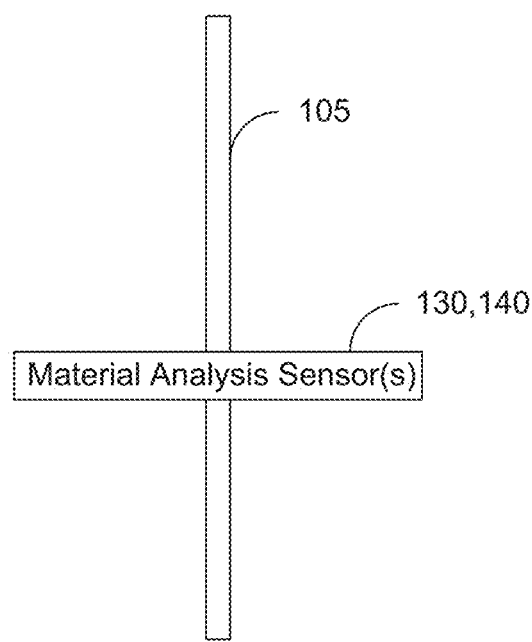
FIGS. 6A and 6B show representations of respective at least one material analysis sensor measuring either feedstock or material to be sintered.
Figure 6B:
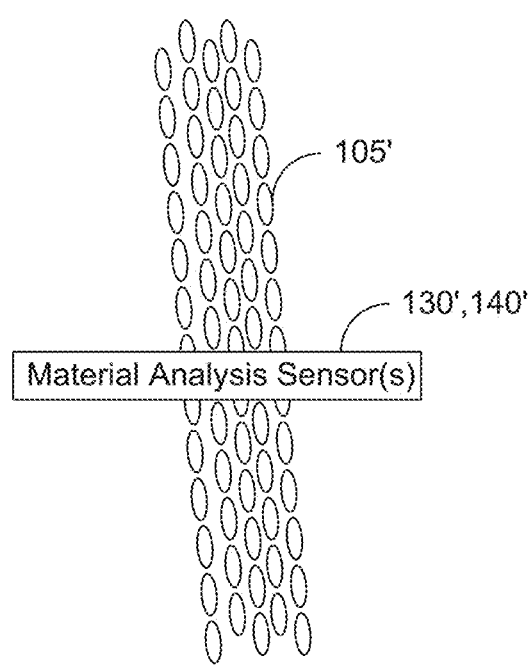

FIGS. 6A and 6B show representations of respective at least one material analysis sensor measuring either feedstock or material to be sintered or applied with FDM. The sensors may be one of the ones discussed above such as, but not limited to, hyperspectral sensor 130, 130', which may image the material at a particular location in multiple spectral bands nearly simultaneously, or the density sensor 140, 140'. The at least one material analysis sensor may be provided at a location separated from a location where the size sensor 135, 135' is located. For example, with respect to FIGS. 1 and 2, the at least one material analysis sensor 130, 130', 140, 140' may be located within the material feeding system 120, 120' or to sense the feedstock once it exits the material feeding system, whereas the size sensor 135, 135' may be located between the material storage and material feeder.

Figure 7A:
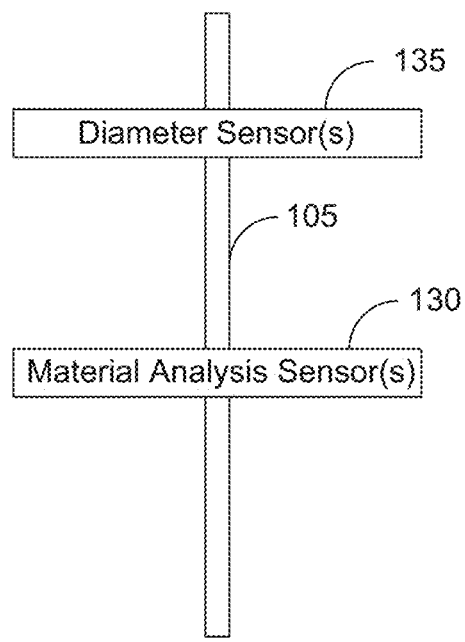
FIGS. 7A and 7B show representations of respective size sensors and at least one material analysis sensors in close proximity.
Figure 7B:
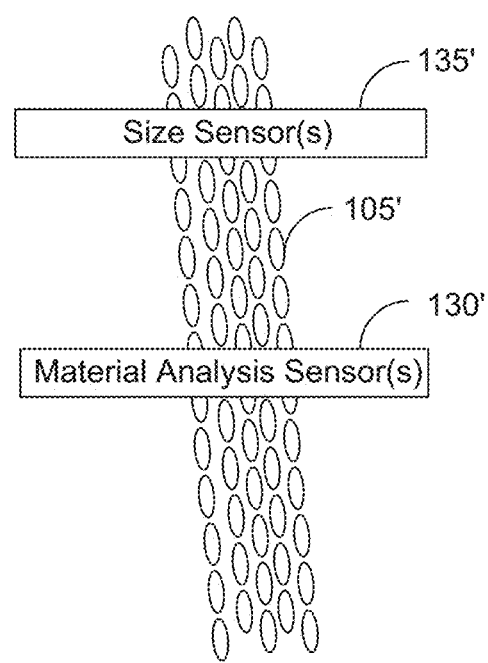

FIGS. 7A and 7B show representations of respective size sensors and at least one material analysis sensors in close proximity. Instead of separating the size sensor 135, 135' and material analysis sensor 130, 130' by the material feed system 120, 120', both sensors 135, 135', 130, 130' may be located where no other subcomponent separates the two. As a non-limiting example, both sensors 130, 130', 135, 135' may be located between the material storage location 110 110' and the material feed system 120, 120'. In another non-limiting example, both sensors 130, 130', 135, 135' may be located to sense the material 105, 105' after it leaves the material feeder or material feed system 120, 120'.

FIGS. 8-30 show various flowcharts of various methods that may be provided with the systems disclosed herein. In each embodiment shown, "Inspection" may be substituted with "Sensor Data" or "Measurement." Therefore, the term "inspection" is not provided to be limiting.

Figure 8:
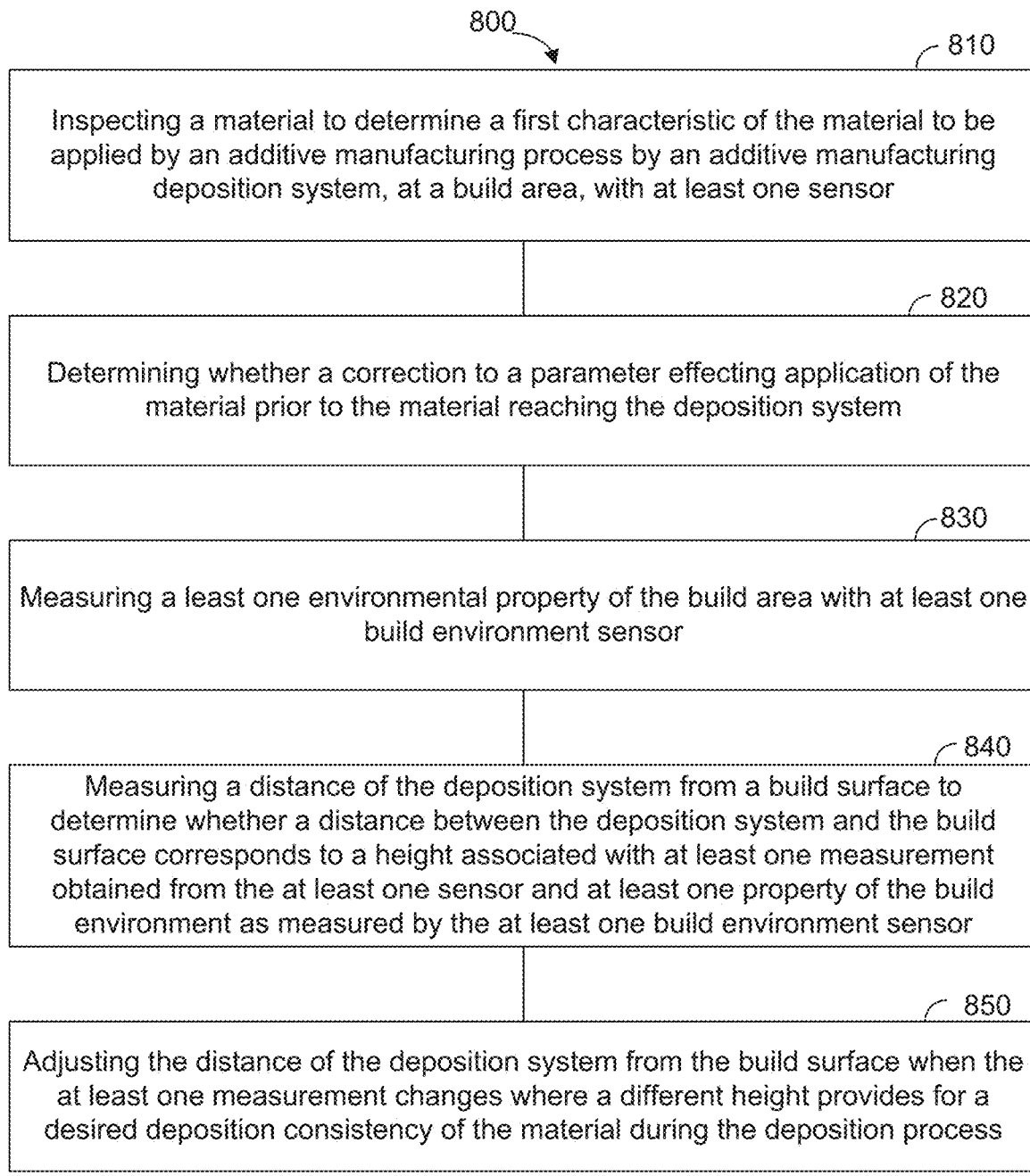
FIGS. 8-30 are flowcharts illustrating an embodiment of a method.
Figure 9:
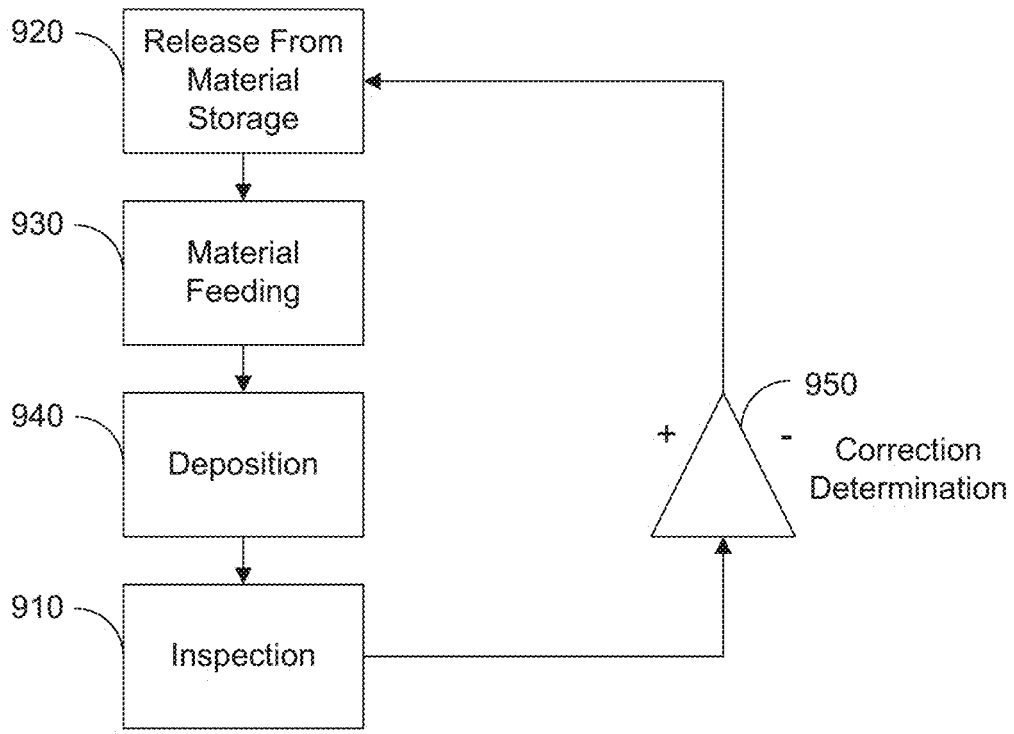
Figure 10:
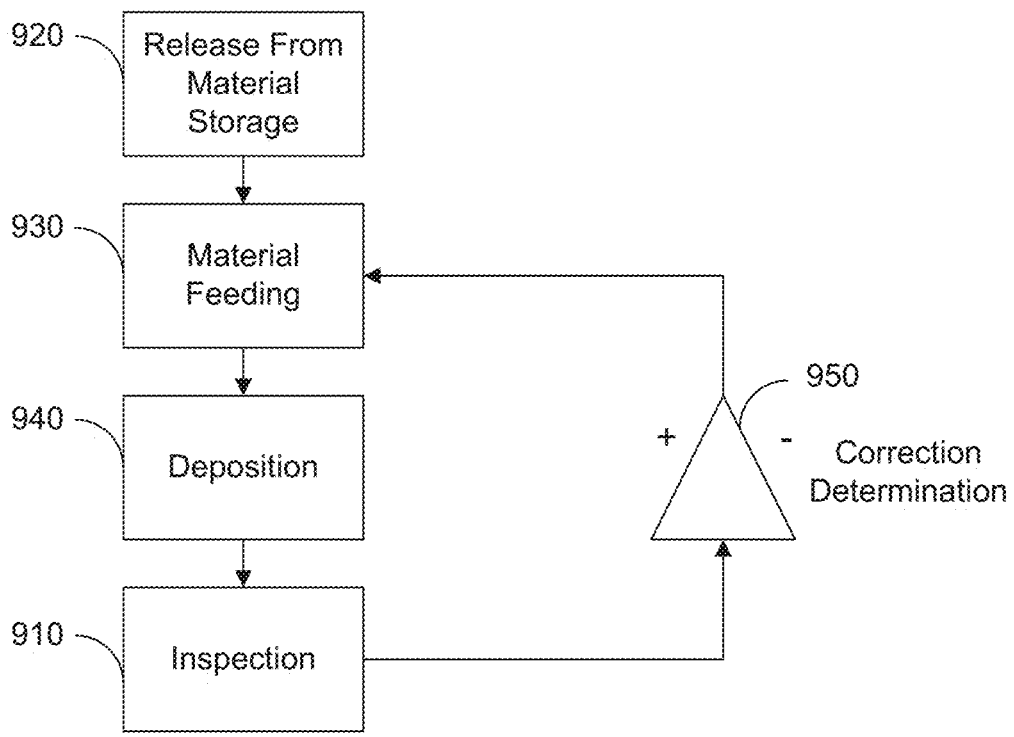
Figure 11:
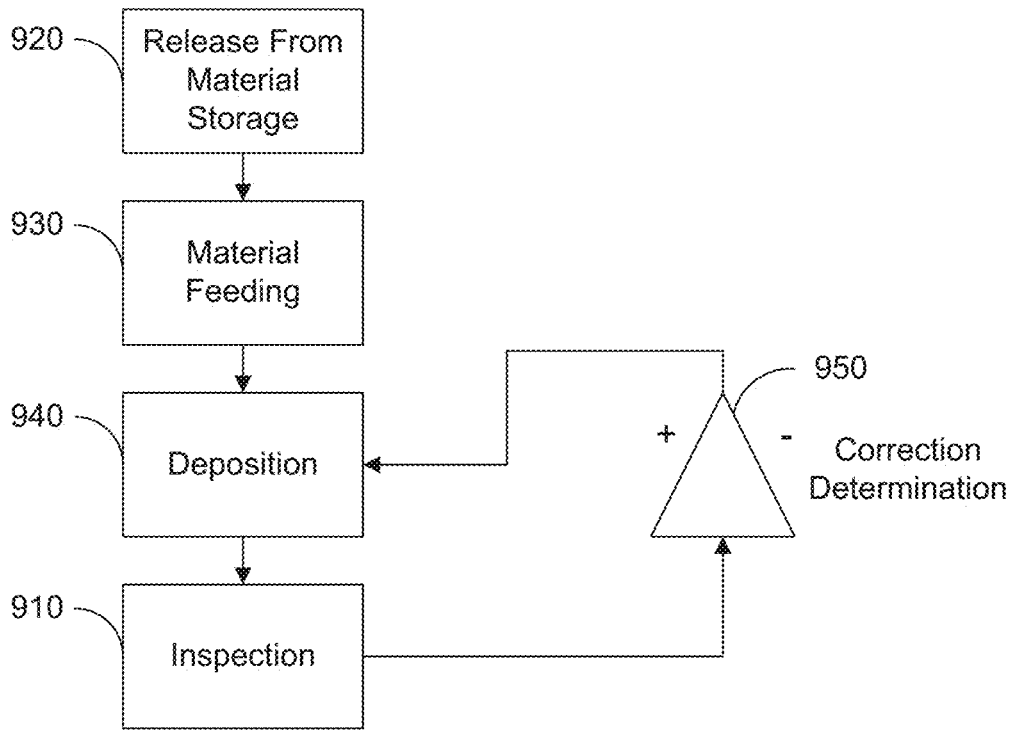
Figure 12:
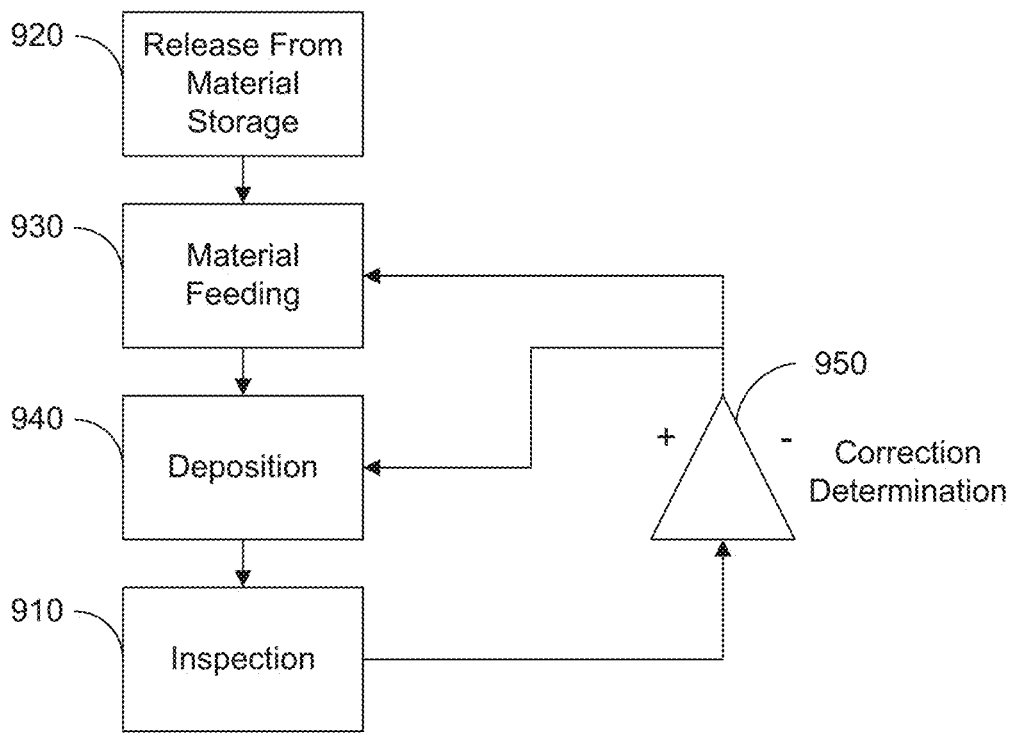
Figure 13:
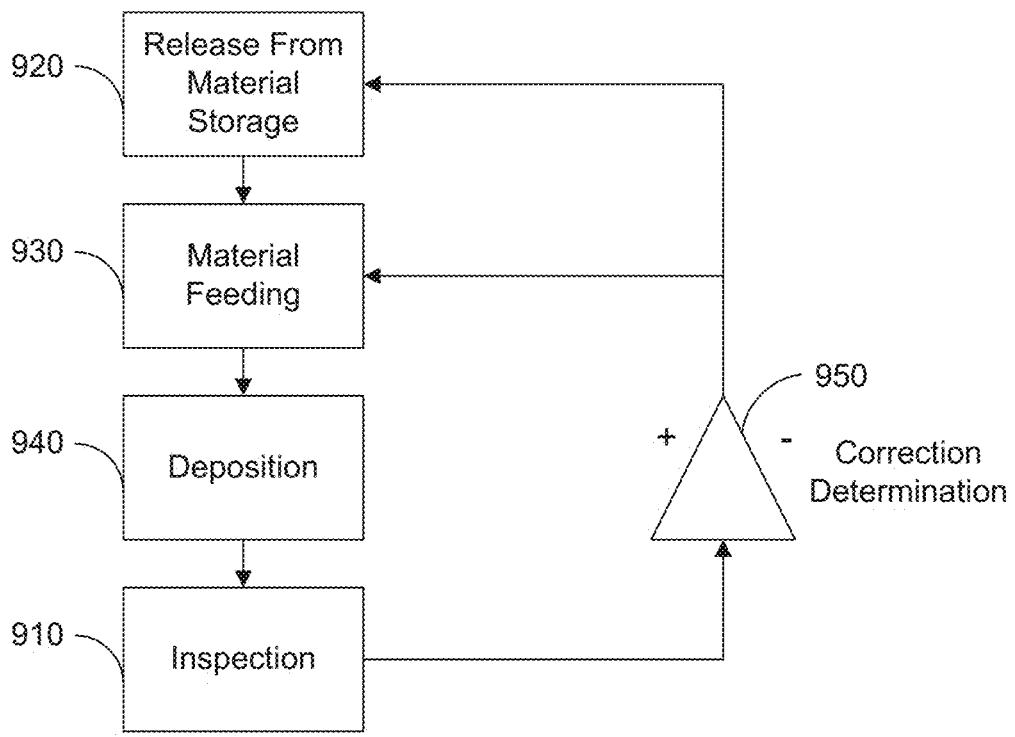
Figure 14:
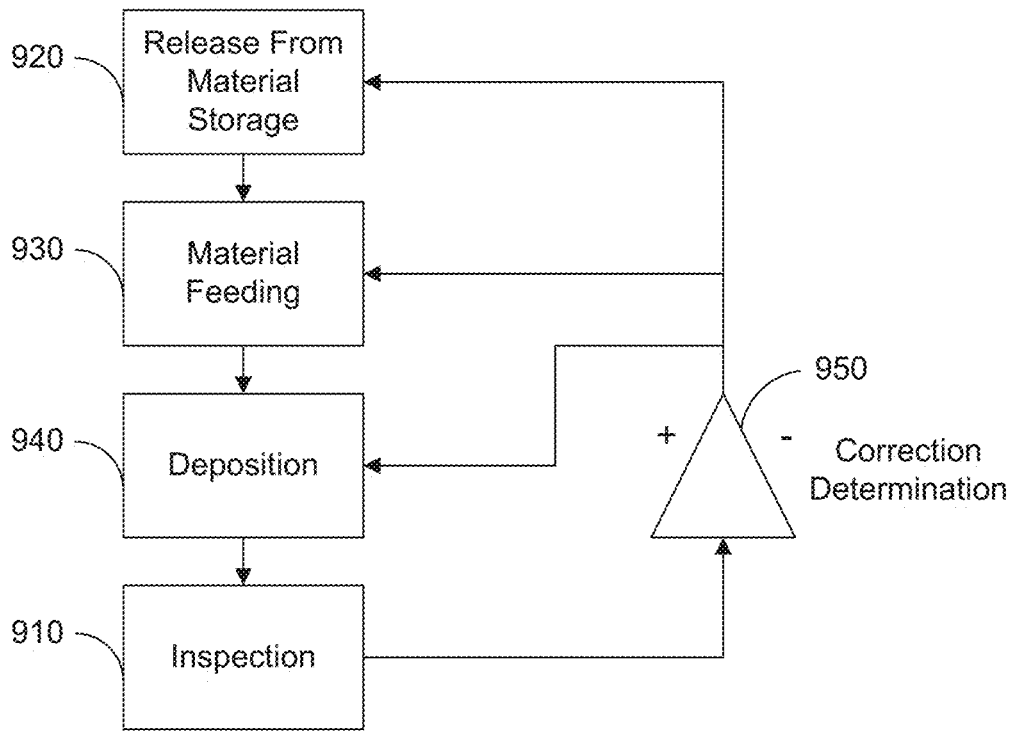
Figure 15:
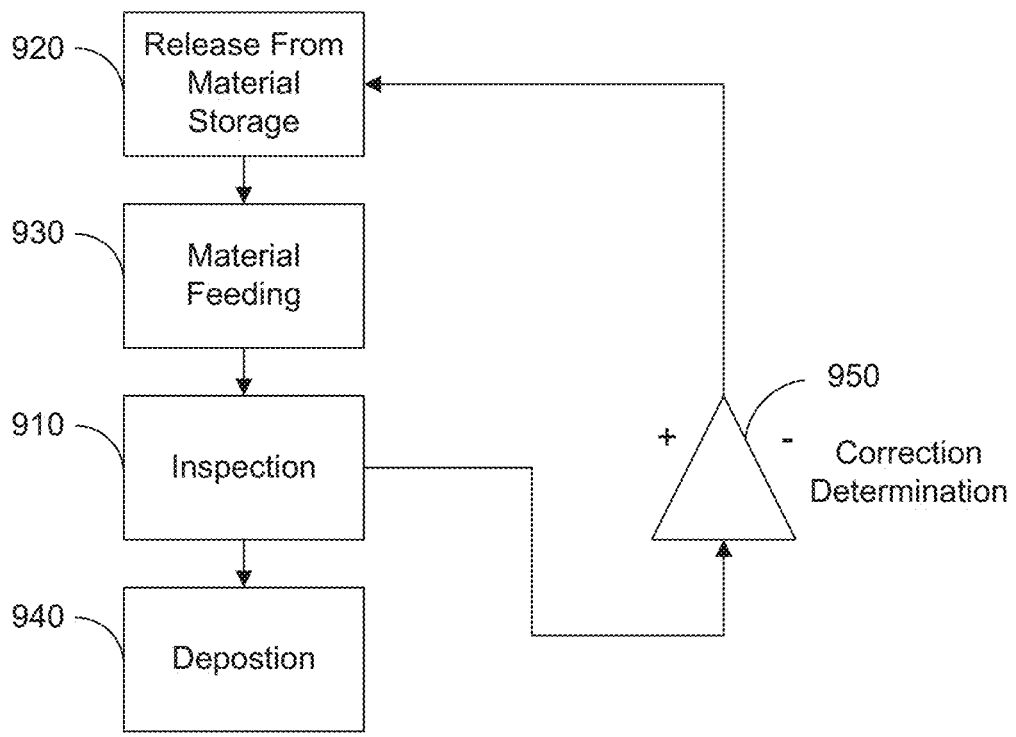
Figure 16:
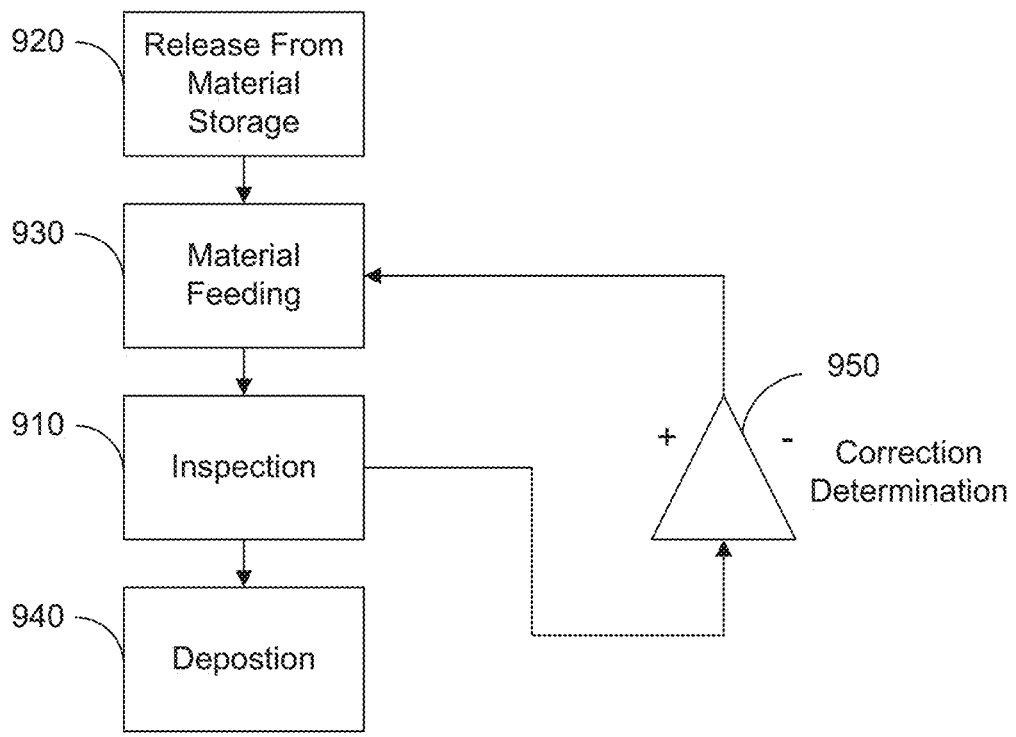
Figure 17:
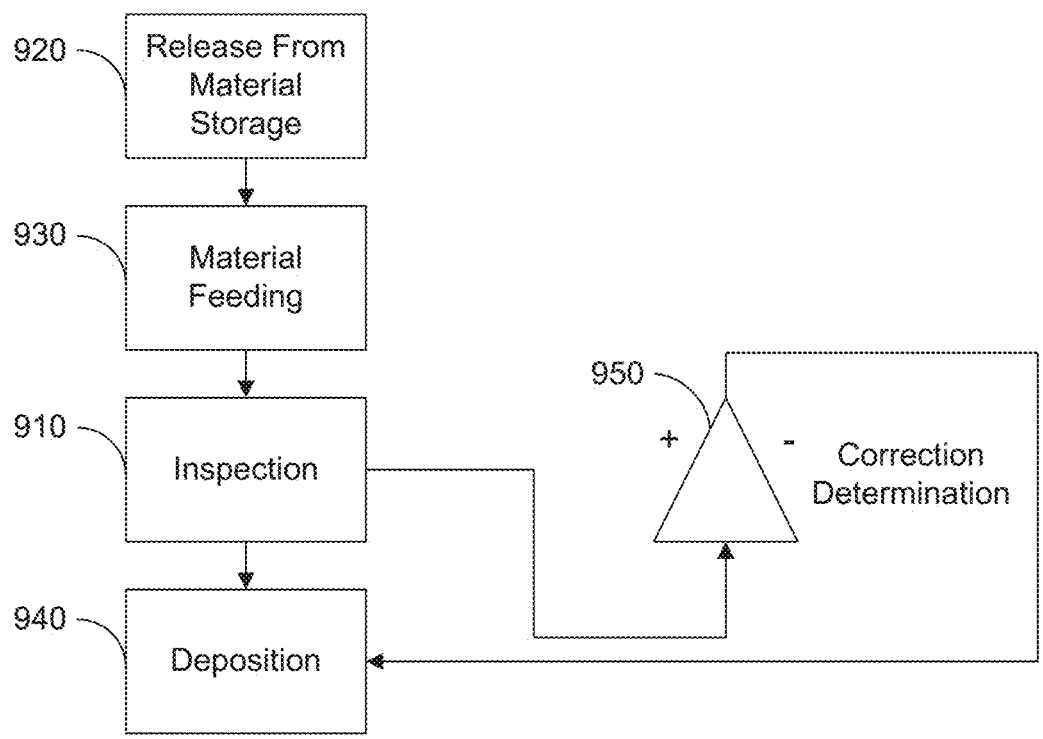
Figure 18:
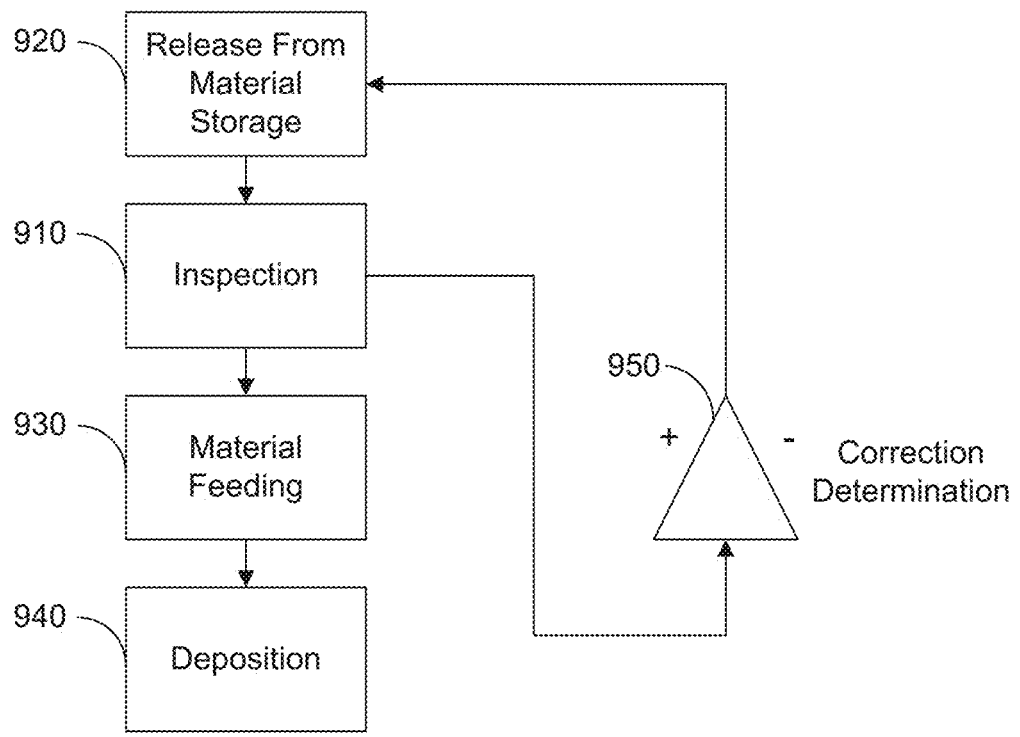
Figure 19:
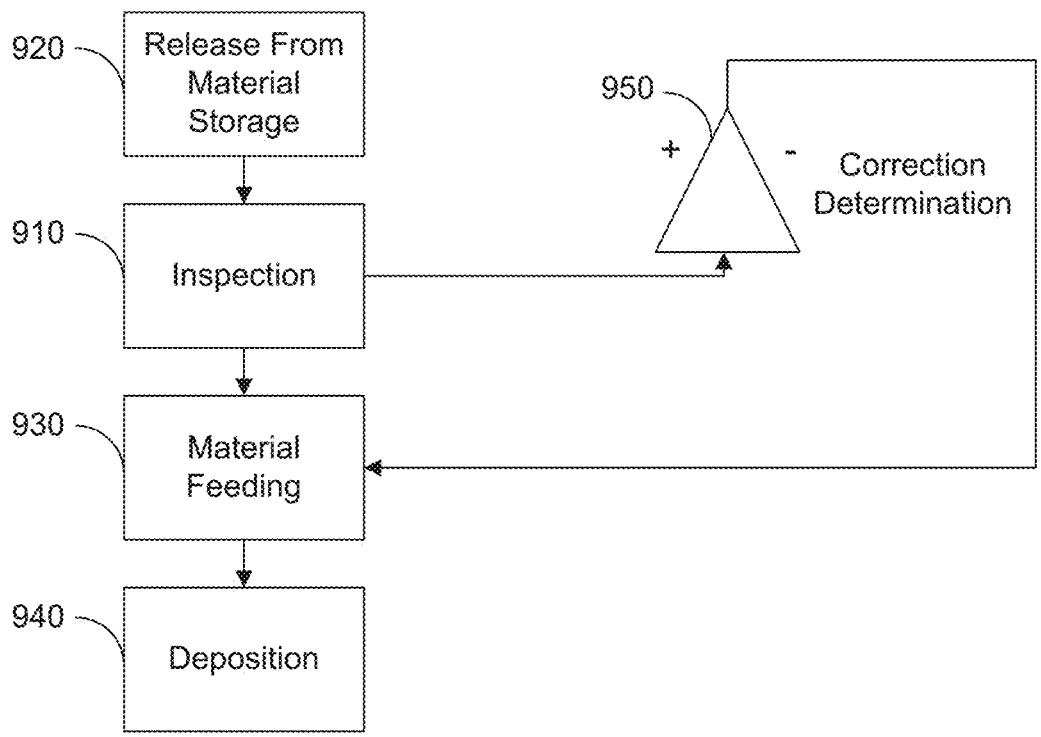
Figure 20:
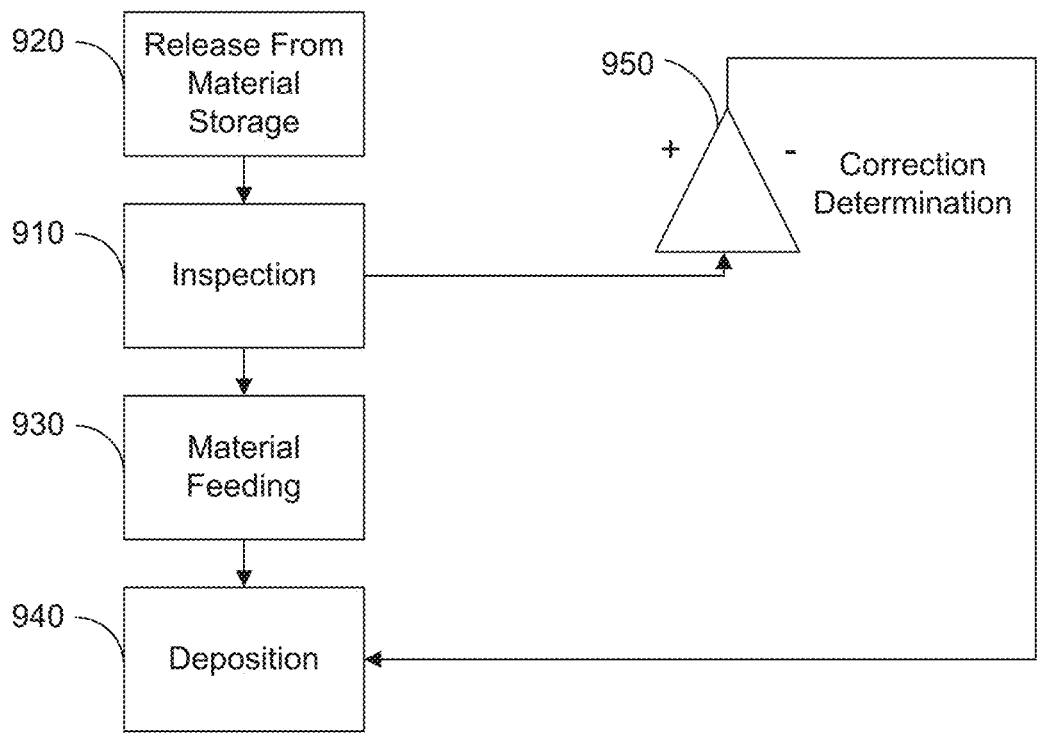
Figure 21:
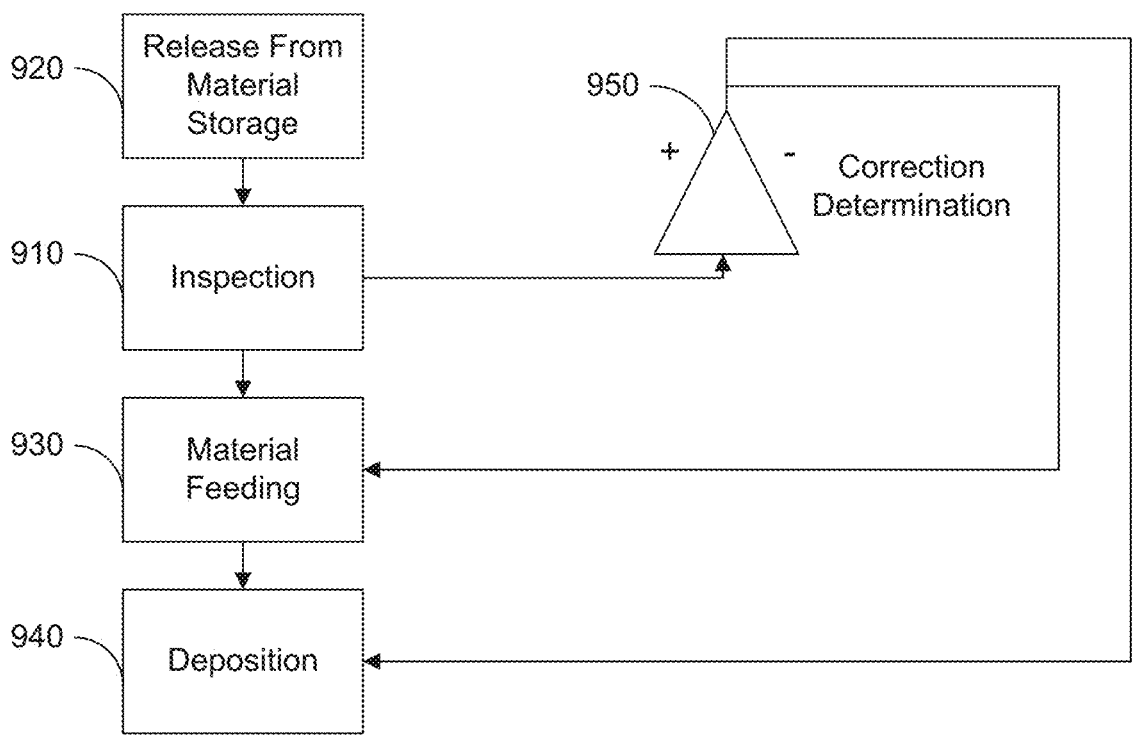
Figure 22:
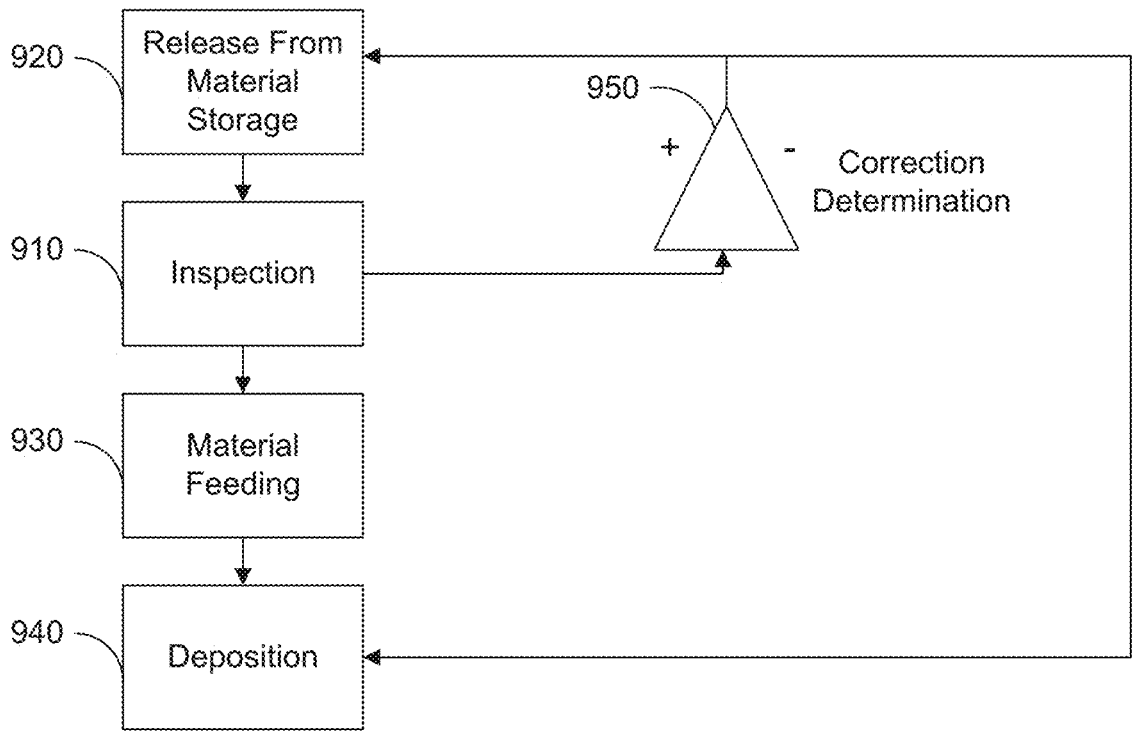
Figure 23:
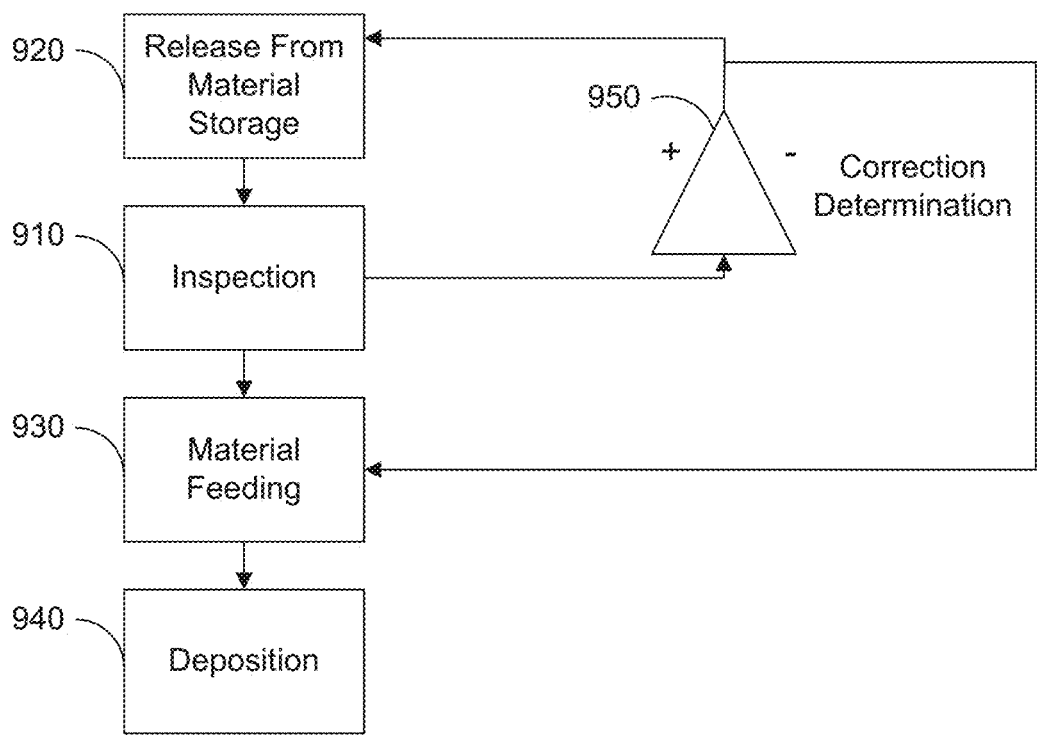
Figure 24:
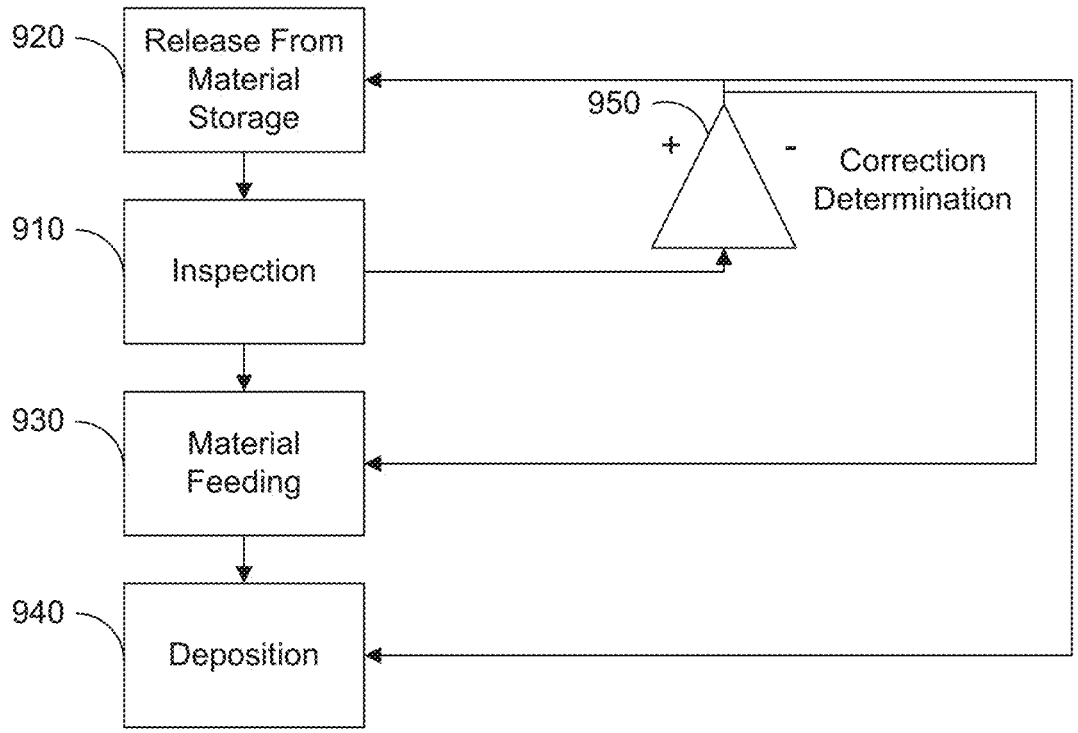
Figure 25:
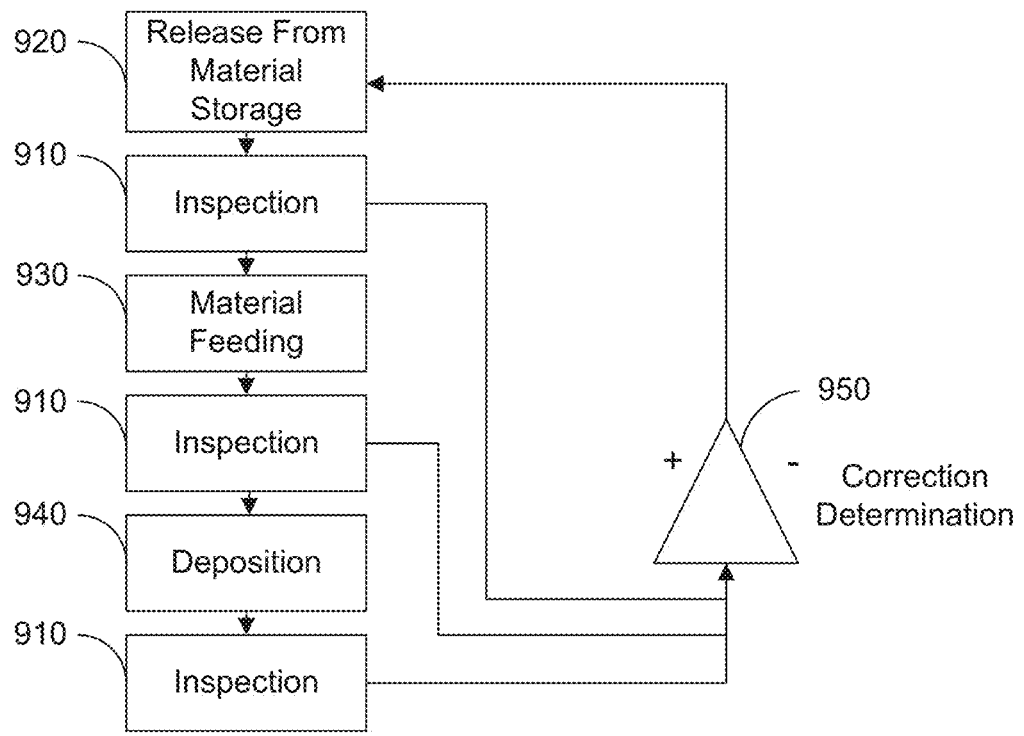
Figure 26:
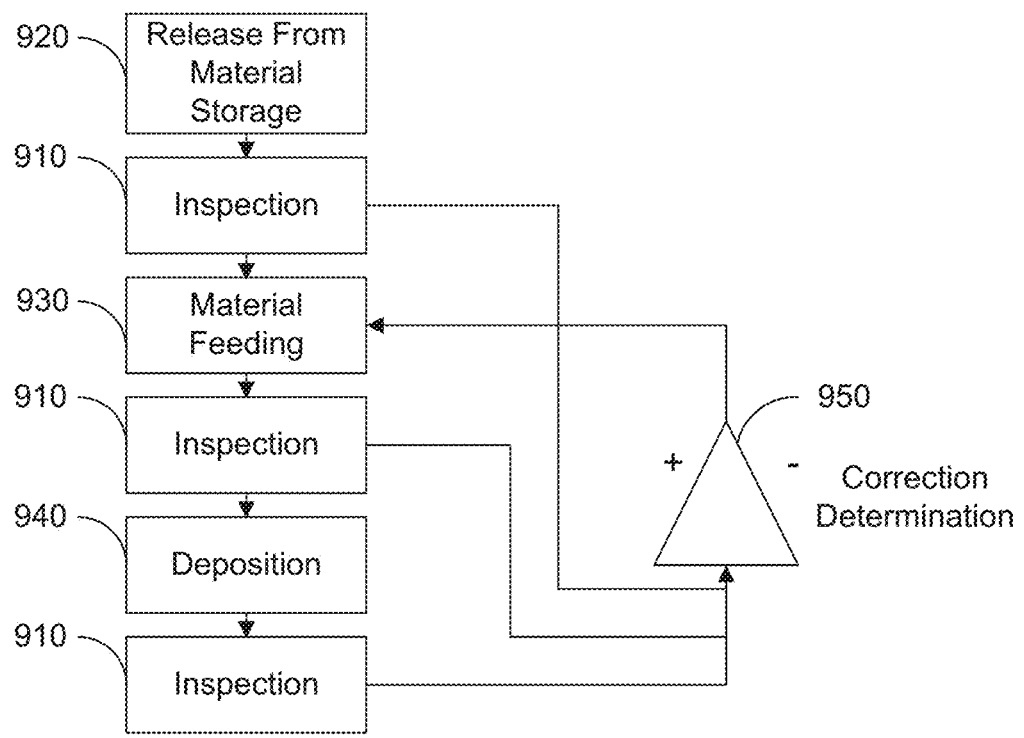
Figure 27:
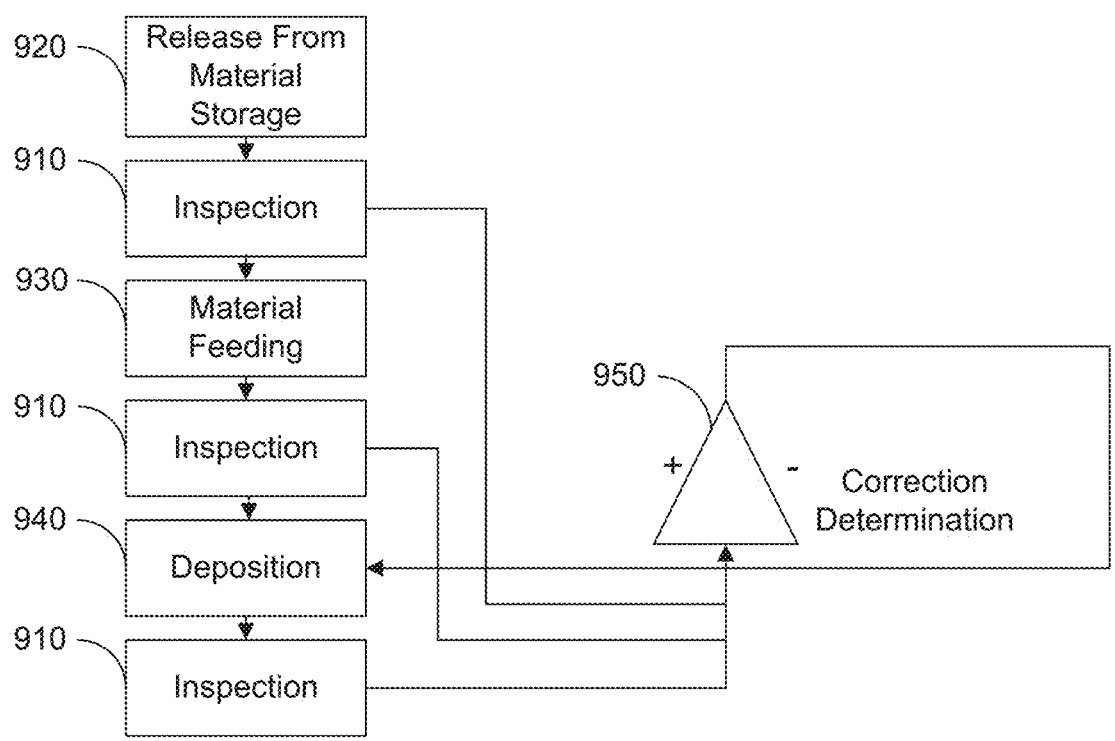
Figure 28:
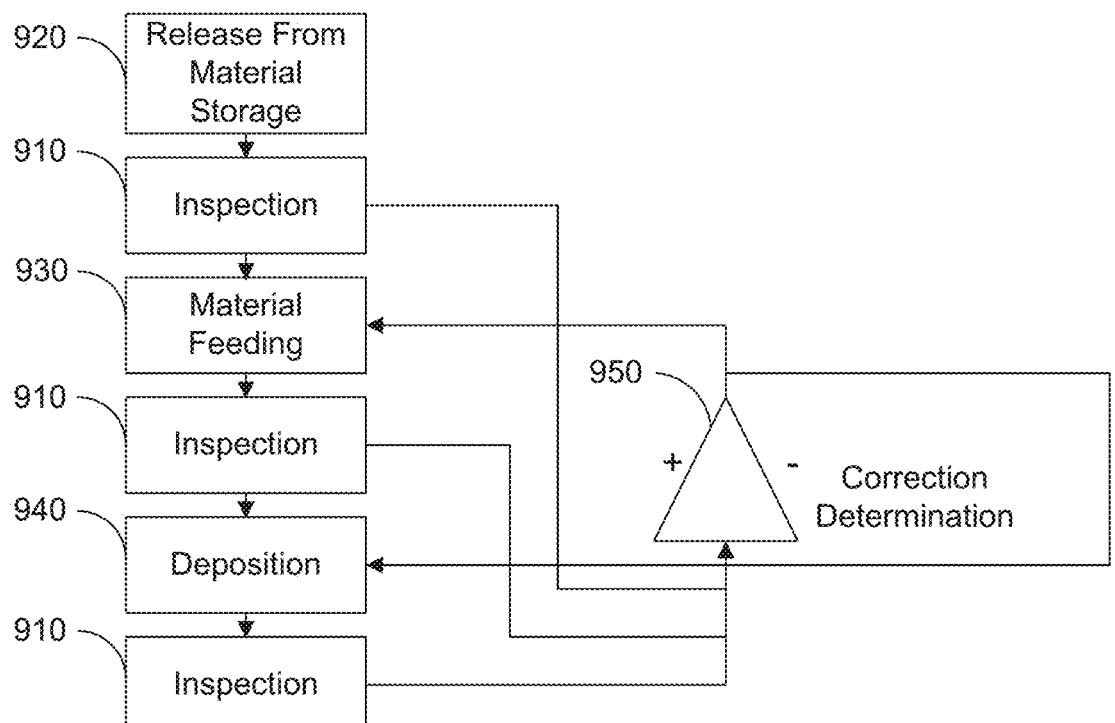
Figure 29:
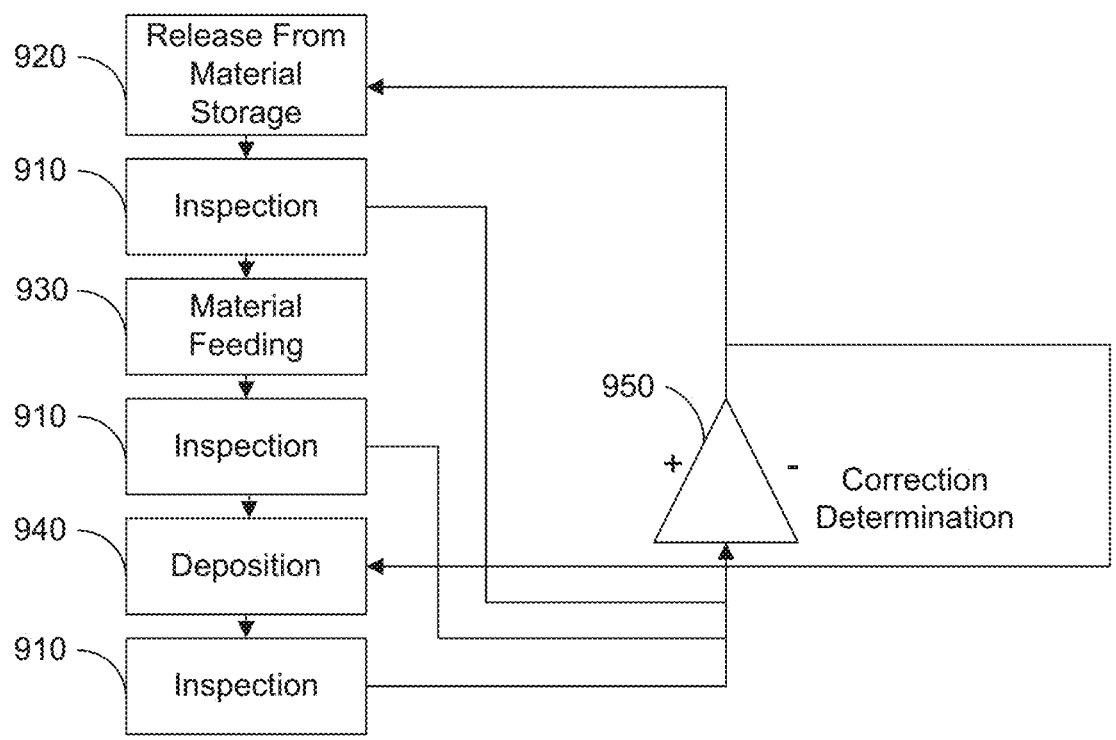
Figure 30:
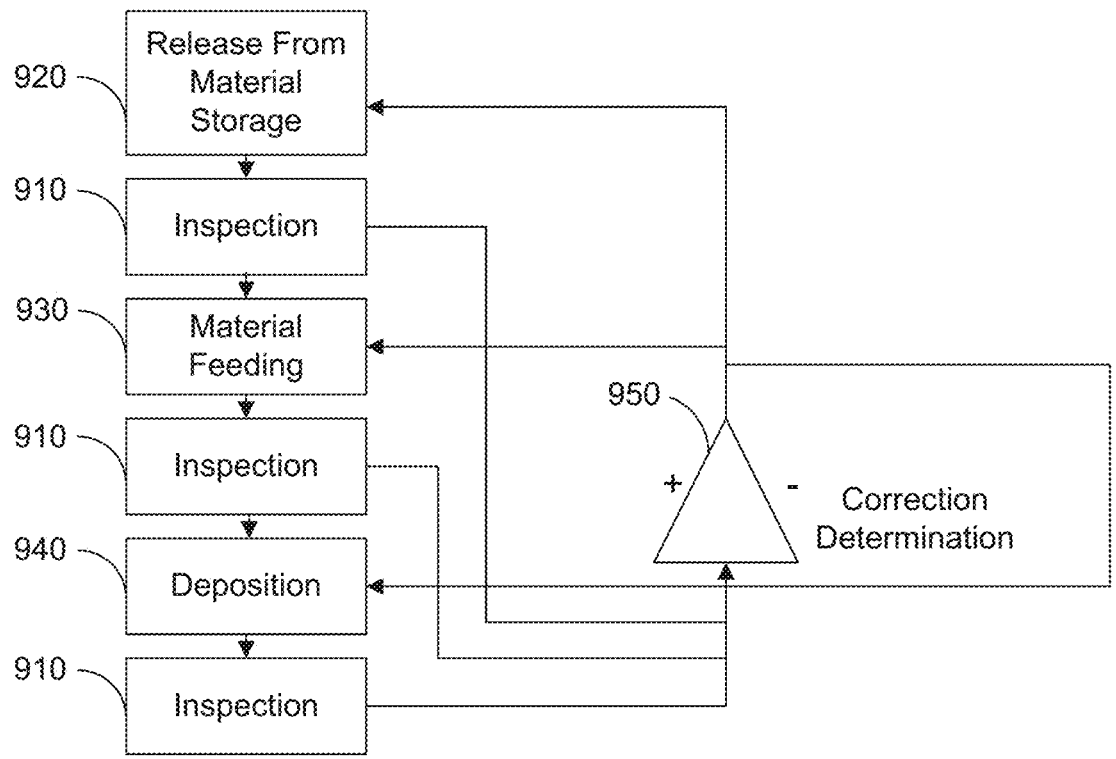

As shown in FIG. 8, the flowchart of a method 800 provides for inspecting a material to determine a first characteristic of the material to be applied by an additive, at 810. The method 800 further includes manufacturing process by an additive manufacturing deposition system, at a build area, with at least one sensor, at 820. The method also provides for determining whether a correction to a parameter effecting application of the material prior to the material reaching the deposition system, at 830. The method 800 also provides for measuring at least one environmental property of the build area with at least one build environment sensor, at 840. The method 800 also provides for measuring a distance of the deposition system from a build surface to determine whether a distance between the deposition system and a build surface corresponds to a height associated with the at least one of one measurement obtained from the at least one sensor and at least one property of the build environment as measured by the at least one build environment sensor, at 850. The method 800 also provides for adjusting the distance of the deposition system from the build surface when the at least one measurement changes where a different height provides for a desired deposition consistency of the material during the deposition process with a traverse system, at 860.

The method 800 may also provide for inspecting the material with at least a second sensor to determine a second characteristic of the material prior to deposition. Additionally, the method 800 may also provide for inspecting at least one of a layer of an object being built and the object being built with a geometric scanner. The method 800 may also provide for changing a speed of the material applied to the deposition system based on the first characteristic of the material determined. The method 800 may also include altering an environment at the build environment with an environmental control unit responsive to at least one measurement from at least one of the first sensor and at least one build environment sensor. The method 800 may also include adjusting at least one of a rate the material is supplied by a material feeder and a height adjustment made by the traverse system responsive to operation of an environmental control unit. Furthermore, the method 800 may include inspecting at least one of a layer of an object and the object made with the additive manufacturing process with a geometric scanner.

As is shown further with respect to FIGS. 9-30, the steps may be arranged in a plurality of orders. Thus, as shown in each of FIGS. 9-30, once inspection is performed, a determination may be made whether a correction, at 950 is needed. As further shown in the various embodiments shown in FIGS. 9-30, as the material 105, 105' passes through various components, namely the material storage area 110, 110' (where the material is released from the material storage area, at 920), material feeder 120, 120' (where the material is feed from the material feeder, at 930), and deposition system 142, 210 (where the material is applied by deposition, at 940), a determination regarding a correction, at 950 may be applied to any one of the material storage and release of material from the material storage area, material feeding and deposition, whether the process uses feedstock or sintering. The arrangement of each of these steps may be varied, as shown in FIGS. 9-30, but after each inspection, at 910, a determination, at 950 may be made.

FIG. 31 shows a block diagram illustrating computing functionality of a processing system that may be used to implement an embodiment disclosed herein. The methods provided in FIGS. 8-30 may be used in association with the computing functionality 1000 disclosed below to provide for real time monitoring and feedback in the deposition process. Multiple sensors may provide data that is used by correction applications provided herein with respect to FIGS. 1, 2 and 8-30 where simultaneous monitoring and correction may be provided.

In all cases, computing functionality 1000 represents one or more physical and tangible processing mechanisms. The computing functionality 1000 may comprise volatile and non-volatile memory, such as random-access memory (RAM) 1002 and read only memory ("ROM") 1004, as well as one or more processing devices 1006 (e.g., one or more central processing units (CPUs), one or more graphical processing units (Gus), and the like). The computing functionality 1000 also optionally comprises various media devices 1008, such as a hard disk module, an optical disk module, and so forth. The computing functionality 1000 may perform various operations identified above when the processing device(s) 1006 execute(s) instructions that are maintained by memory (e.g., RAM 1002, ROM 1004, and the like).

Instructions and other information may be stored on any computer readable medium 610, including, but not limited to, static memory storage devices, magnetic storage devices, and optical storage devices. The term "computer readable medium" also encompasses plural storage devices. In all cases, computer readable medium 1010 represents some form of physical and tangible entity. By way of example, and not limitation, the computer readable medium 610 may comprise "computer storage media" and "communications media."

"Computer storage media" comprises volatile and non-volatile, removable and non-removable media implemented in any method or technology for storage of information, such as computer readable instructions, data structures, program modules, or other data. The computer storage media may be, for example, and not limitation, RAM 1002, ROM 1004, EPSOM, Flash memory, or other memory technology, CD- ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, FRO, infrared, and other wireless media. Combinations of any of the above are also included within the scope of computer readable medium.

The computing functionality 1000 may also comprise an input/output module 1012 for receiving various inputs (via input modules 1014), and for providing various outputs (via one or more output modules). One particular output module mechanism may be a presentation module 1016 and an associated graphic user interface ("GUI") 1018. The computing functionality 1000 may also include one or more network interfaces 1020 for exchanging data with other devices via one or more communication conduits 1022. In some embodiments, one or more communication buses 1024 communicatively couple the above-described components together.

The communication conduit(s) 1022 may be implemented in any manner (e.g., by a local area network, a wide area network (e.g., the Internet), and the like, or any combination thereof). The communication conduit(s) 1022 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (Fogs), Application-specific Integrated Circuits (Asics), Application-specific Standard Products (Asps), System-on-a-chip systems (Sacs), Complex Programmable Logic Devices (Colds), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things device, and the like).

Thus, as discussed above data from any one of the sensors disclosed above may be provided to the computing functionality 1000 to determine at least placement of the dispenser 142, 210 where the processor and a processor executable instructions are stored on the tangible storage medium to receive a measurement from the first sensor to determine a height of the deposition system from the build location.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:
1. A system, the system comprising:
 a deposition system to create a layer of an object during an additive manufacturing process;
 a material feeder to deliver a material for application to the object by the deposition system;
 a first sensor to measure at least one property of the material prior to the material entering the deposition system;
 at least one build environment sensor to measure at least one property of a build environment;

a rangefinder to determine a height of the deposition system above a build location where the object is being additively manufactured, responsive to the at least one property of the build environment as measured by the at least one build environment sensor;

a traverse system to adjust a height of the deposition system from the build location responsive to a measurement taken by the first sensor, the traverse system further configured to position the deposition system for creation of the layer of the object during an additive manufacturing process;

wherein the measured property measured by the first sensor is a material density; and wherein the measured material density deviates from a nominal material density and, responsive to the deviation, a material feeder rate of the material feeder is altered.

2. The system according to claim 1, further comprising a processor and processor executable instructions stored on a tangible storage medium to receive a measurement from the first sensor to determine a height of the deposition system from the build location.

3. The system according to claim 1, wherein the deposition system is at least one of a fused deposition additive manufacturing process and a sintering additive manufacturing process.

4. The system according to claim 1, wherein the first sensor comprises at least one of a diameter sensor, a hyperspectral sensor, a density sensor and a temperature sensor.

5. The system according to claim 1, further comprising a second sensor wherein the first sensor and the second sensor comprise collectively a diameter sensor and a hyperspectral sensor, a diameter sensor and a density sensor, and a hyperspectral sensor and a density sensor.

6. The system according to claim 1, wherein the measurement further causes a change in speed that the material is provided to the deposition system.

7. The system according to claim 1, further comprising a geometric scanner to inspect at least one of a layer of the object being built and the object being built.

8. The system according to claim 1, wherein the first sensor measures at least one of geometric properties, internal properties, and external properties of the material at least one of prior to deposition, during deposition and after deposition.

9. The system according to claim 1, wherein the at least one build environment sensor comprises at least one of a humidity sensor, a pressure sensor and a temperature sensor.

10. The system according to claim 1, further comprising an environmental control unit to alter an environment at the build environment responsive to at least one measurement from at least one of the first sensor and at least one build environment sensor.

11. The system according to claim 10, wherein at least one of application of the material by the material feeder and height adjustment made by the traverse is responsive to operation of the environmental control unit.

12. The system according to claim 1, wherein a material feeder property of the material feeder is altered responsive to a measurement taken by at least one of: the first sensor; and the build environment sensor.

13. The system according to claim 12, wherein the material feeder property of the material feeder altered responsive to the measurement taken by the at least one of: the first sensor; and the build environment sensor alters the temperature of the material delivered to the deposition system.

14. The system according to claim 13, wherein the material feeder property of the material feeder altered responsive to the measurement taken by the at least one of: the first sensor; and the build environment sensor alters the feeder rate of the material delivered to the deposition system.

15. A method, the method comprising:
inspecting a material to determine a first characteristic of the material to be applied by an additive manufacturing process by an additive manufacturing deposition system, at a build area, with at least one sensor, wherein the first characteristic is at least a material density;

determining whether a correction to a parameter effecting application of the material prior to the material reaching the deposition system;

altering a feed rate of the additive manufacturing deposition system if the correction determined is based on the measured material density deviating from a nominal material density;

measuring at least one environmental property of a build environment at the build area with at least one build environment sensor;

measuring a distance of the deposition system from a build surface to determine whether a distance between the deposition system and a build surface corresponds to a height associated with the at least one of one measurement obtained from the at least one sensor and at least one property of the build environment as measured by the at least one build environment sensor; and adjusting the distance of the deposition system from the build surface when the at least one measurement changes where a different height provides for a desired deposition consistency of the material during the deposition process with a traverse system.

16. The method according to claim 15, further comprising inspecting the material with at least a second sensor to determine a second characteristic of the material prior to deposition.

17. The method according to claim 15, further comprising inspecting at least one of a layer of an object being built and the object being built with a geometric scanner.

18. The method according to claim 15, wherein altering the feed rate further comprising changing a speed of the material applied to the deposition system based on the first characteristic of the material determined.

19. The method according to claim 15, further comprising altering an environment at the build environment with an environmental control unit responsive to at least one measurement from at least one of the first sensor and at least one build environment sensor.

20. The method according to claim 15, further comprising adjusting at least one of a rate the material is supplied by a material feeder and a height adjustment made by the traverse system responsive to operation of an environmental control unit.

21. The method according to claim 15, further comprising inspecting at least one of a layer of an object and the object made with the additive manufacturing process with a geometric scanner.

22. A system, the system comprising:
an additive manufacturing device, the additive manufacturing device comprising:
a deposition system,
a material storage device to hold a material prior to deposition,
a material feeding system to provide the material to the deposition system, and a build area where an object is created with an additive manufacturing process;

at least a first sensor to measure at least one characteristic of a material to be applied to create an object with an additive manufacturing process;

a rangefinder to determine a height of the deposition system from the build area; and a traverse system to adjust, in real time, the deposition system in response to a characteristic of the material detected during a deposition process;

wherein the at least one characteristic measured by the at least first sensor is a material density; and wherein the measured material density deviates from a nominal material density and, responsive to the deviation, a material feeder rate of the material feeder is altered.

23. The system according to claim 22, further comprising a processor and processor executable instructions stored on a tangible storage medium to receive a measurement from the first sensor to determine a height of the deposition system from the build area.

24. The system according to claim 22, wherein the first sensor comprises at least one of a diameter sensor, a hyperspectral sensor and a density sensor.

25. The system according to claim 22, further comprising at least a second sensor wherein the first sensor and the second sensor comprise collectively a diameter sensor and a hyperspectral sensor, a diameter sensor and a density sensor, and a hyperspectral sensor and a density sensor.

26. The system according to claim 22, further comprising a geometric scanner to inspect at least one of a layer of the object being built and the object being built.

27. The system according to claim 22, wherein the at least first sensor measures at least one of geometric properties, internal properties, and external properties of the material at least one of prior to deposition, during deposition and after deposition.

28. The system according to claim 22, further comprising at least one build environment sensor to measure at least one property of a build environment of the build area, wherein the at least one build environment sensor comprises at least one of a humidity sensor, a pressure sensor and a temperature sensor.

29. A system, the system comprising:

a deposition system to create a layer of an object during an additive manufacturing process;

a material feeder to deliver a material for application to the object by the deposition system;

a first sensor to measure at least one property of the material prior to the material entering the deposition system;

at least one build environment sensor to measure at least one property of a build environment;

a rangefinder to determine a height of the deposition system above a build location where the object is being additively manufactured;

a traverse system to adjust a height of the deposition system from the build location responsive to a measurement taken by at least one of: the first sensor; and the build environment sensor, wherein a material feeder property of the material feeder is altered responsive to a measurement taken by at least one of: the first sensor; and the build environment sensor;

wherein a deposition system property of the deposition system is altered responsive to a measurement taken by at least one of: the first sensor; and the build environment sensor;

wherein the measured property measured by the first sensor is a material density; and wherein the measured material density deviates from a nominal material density and, responsive to the deviation, a material feeder rate of the material feeder is altered.

* * * * *